United States Patent
Sugiura et al.

(10) Patent No.: US 10,275,035 B2
(45) Date of Patent: Apr. 30, 2019

(54) DEVICE AND METHOD FOR DETERMINING GESTURE, AND COMPUTER-READABLE STORAGE MEDIUM FOR COMPUTER PROGRAM

(71) Applicant: Konica Minolta, Inc., Chiyoda-ku (JP)

(72) Inventors: Hiroshi Sugiura, Toyokawa (JP);
Hiroshi Iwamoto, Toyohashi (JP);
Kenichi Sawada, Toyohashi (JP);
Takeshi Hibino, Toyokawa (JP);
Tomoko Maruyama, Toyokawa (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 153 days.

(21) Appl. No.: 14/209,391

(22) Filed: Mar. 13, 2014

(65) Prior Publication Data
US 2014/0289665 A1 Sep. 25, 2014

(30) Foreign Application Priority Data
Mar. 25, 2013 (JP) .................................. 2013-061386

(51) Int. Cl.
*G06F 3/00* (2006.01)
*G06F 3/01* (2006.01)
*G06F 3/0488* (2013.01)

(52) U.S. Cl.
CPC .......... *G06F 3/017* (2013.01); *G06F 3/04883* (2013.01)

(58) Field of Classification Search
None
See application file for complete search history.

(56) References Cited

U.S. PATENT DOCUMENTS

| | | | |
|---|---|---|---|
| 2007/0126711 A1 | 6/2007 | Oshita | |
| 2009/0257078 A1* | 10/2009 | Sawada | G06F 21/608 358/1.14 |
| 2010/0117963 A1* | 5/2010 | Westerman | G06F 3/03543 345/163 |

(Continued)

FOREIGN PATENT DOCUMENTS

| | | |
|---|---|---|
| CN | 102135858 A | 7/2011 |
| CN | 102184020 A | 9/2011 |

(Continued)

OTHER PUBLICATIONS

Notification of Reasons for Refusal issued in corresponding Japanese Patent Application No. 2013-061386; dated Feb. 3, 2015, with English Abstract. (10 pages).

(Continued)

*Primary Examiner* — Toan H Vu
(74) *Attorney, Agent, or Firm* — Buchanan Ingersoll & Rooney PC

(57) ABSTRACT

A device for determining a gesture includes a display portion for selectively displaying one of screens; a storage portion for storing, for each of the screens, a rule used for distinguishing between gestures; a detection portion for detecting a motion made by a user; and a determination portion for identifying, from among the gestures, a gesture represented by the motion detected by the detection portion based on the rule for a current screen, the current screen being one of the screens and being displayed at a time when the motion has been detected.

22 Claims, 24 Drawing Sheets

(56) References Cited

U.S. PATENT DOCUMENTS

| | | | |
|---|---|---|---|
| 2010/0277429 A1* | 11/2010 | Day | G06F 3/0416 345/173 |
| 2011/0037720 A1 | 2/2011 | Hirukawa et al. | |
| 2011/0141050 A1* | 6/2011 | Miura | G06F 3/04883 345/173 |
| 2011/0157048 A1 | 6/2011 | Nakatani | |
| 2011/0163988 A1 | 7/2011 | Senda | |
| 2011/0179368 A1 | 7/2011 | King et al. | |
| 2011/0181526 A1 | 7/2011 | Shaffer et al. | |
| 2011/0199628 A1* | 8/2011 | Tohki | H04N 1/0035 358/1.13 |
| 2011/0202834 A1* | 8/2011 | Mandryk | G06F 3/04883 715/701 |
| 2011/0289456 A1* | 11/2011 | Reville | G06F 3/017 715/830 |
| 2012/0105363 A1* | 5/2012 | Sirpal | G06F 1/1616 345/174 |
| 2012/0131517 A1 | 5/2012 | Yamamoto | |
| 2012/0260172 A1* | 10/2012 | Friedlander | H04N 21/4314 715/719 |
| 2012/0327443 A1 | 12/2012 | Fujii | |
| 2013/0027309 A1 | 1/2013 | Li et al. | |
| 2013/0135236 A1* | 5/2013 | Yano | G06F 3/0488 345/173 |
| 2013/0161381 A1* | 6/2013 | Roundtree | G06Q 30/0207 235/375 |
| 2013/0176256 A1* | 7/2013 | Hara | G06F 3/0485 345/173 |
| 2013/0234960 A1* | 9/2013 | Yamamoto | G06F 3/04883 345/173 |
| 2013/0241819 A1* | 9/2013 | Yamashita | G06F 3/017 345/156 |
| 2013/0305352 A1* | 11/2013 | Narendra | H04M 1/673 726/19 |
| 2014/0176455 A1* | 6/2014 | Araki | G06F 3/016 345/173 |
| 2014/0210727 A1* | 7/2014 | Wassingbo | G06F 3/0488 345/173 |
| 2014/0267094 A1* | 9/2014 | Hwang | G06F 3/0488 345/173 |
| 2014/0282215 A1* | 9/2014 | Grubbs | G06F 3/0481 715/781 |
| 2014/0282224 A1* | 9/2014 | Pedley | G06F 3/017 715/784 |
| 2014/0282275 A1* | 9/2014 | Everitt | G06F 3/017 715/863 |
| 2014/0289668 A1* | 9/2014 | Mavrody | G06F 3/04886 715/781 |
| 2015/0143273 A1* | 5/2015 | Bernstein | G06F 3/0488 715/767 |

FOREIGN PATENT DOCUMENTS

| | | |
|---|---|---|
| CN | 102236511 A | 11/2011 |
| JP | 2004303000 | 10/2004 |
| JP | 2004355426 | 12/2004 |
| JP | 2007-156634 A | 6/2007 |
| JP | 2009-284468 | 12/2009 |
| JP | 2011-134212 A | 7/2011 |
| JP | 2012-128830 A | 7/2012 |
| JP | 2013-008279 | 1/2013 |
| JP | 2013025369 | 2/2013 |
| WO | 2010032354 | 3/2010 |

OTHER PUBLICATIONS

Notification of Reason(s) for Refusal dated Nov. 1, 2016, by the Japanese Patent Office in corresponding Japanese Patent Application No. 2015-077372 and a partial translation of the Notification. (7 pages).

Office Action dated Aug. 1, 2016, by the State Intellectual Property Office of the People's Republic of China in corresponding Chinese Patent Application No. 201410113790.4 and partial English Translation of the Office Action. (18 pages).

* cited by examiner

FIG. 7

| No. | TYPE | DOCUMENT NAME/ DESTINATION | REGISTERED TIME | TOTAL PAGES | EXECUTION RESULT |
|---|---|---|---|---|---|
| 0009 | COPY | | 13:48 | 1 | SUCCESSFULLY FINISHED |
| 0008 | COPY | | 13:48 | 1 | SUCCESSFULLY FINISHED |
| 0007 | COPY | | 13:47 | 1 | SUCCESSFULLY FINISHED |
| 0006 | COPY | | 13:47 | 1 | SUCCESSFULLY FINISHED |
| 0005 | COPY | | 13:47 | 1 | SUCCESSFULLY FINISHED |
| 0004 | COPY | | 13:47 | 1 | SUCCESSFULLY FINISHED |
| 0003 | COPY | | 13:46 | 1 | SUCCESSFULLY FINISHED |

Tabs: CURRENTLY EXECUTED | HISTORY | COMMUNICATION LIST | ALL | SCAN | FAX | L1 | L2

SELECT JOBS: ALL
NARROW CONDITIONS: ALL JOBS | FINISHED JOBS | DELETED JOBS
DETAILS | COMBINE | CLOSE

FIG. 13

| No. | TYPE | DOCUMENT NAME/ DESTINATION | REGISTERED TIME | TOTAL PAGES | EXECUTION RESULT |
|---|---|---|---|---|---|
| 0009 | COPY | | 11:58 | 1 | SUCCESSFULLY FINISHED |
| 0008 | COPY | | 11:57 | 1 | SUCCESSFULLY FINISHED |
| 0007 | COPY | | 11:56 | 1 | SUCCESSFULLY FINISHED |
| 0006 | COPY | | 09/06 | 100 | DELETED BY USER |
| 0005 | FAX | 1 | 08/28 | 1 | SUCCESSFULLY FINISHED |
| 0004 | COPY | | 08/28 | 1 | SUCCESSFULLY FINISHED |
| 0003 | COPY | CKMBT_C45412082813 | 08/28 | 1 | SUCCESSFULLY FINISHED |

CURRENTLY EXECUTED | HISTORY | COMMUNICATION LIST

ALL | SCAN | FAX | L1 | L2

SELECT JOBS: ALL
NARROW CONDITIONS: ALL JOBS / FINISHED JOBS / DELETED JOBS
DETAILS
COMBINE
CLOSE

DEVICE AND METHOD FOR DETERMINING GESTURE, AND COMPUTER-READABLE STORAGE MEDIUM FOR COMPUTER PROGRAM

This application is based on Japanese patent application No. 2013-061386 filed on Mar. 25, 2013, the contents of which are hereby incorporated by reference.

BACKGROUND OF THE INVENTION

1. Field of the Invention

The present invention relates to a technology for determining gestures such as tap and flick.

2. Description of the Related Art

As technologies for touch-sensitive panels have been recently improved, a variety of gestures such as tap, press, double tap, flick, drag, pinch-in, and pinch-out can be made on such touch-sensitive panels. Further, a device called a "3D gesture input device" or "3D motion input device" for detecting a gesture in a three-dimensional space has started to become available.

Selective use of gestures enables users to enter data and commands more easily than is conventionally possible.

On the other hand, increase in gesture often causes a computer to fail to recognize a gesture correctly as intended by a user.

To address this, there have been technologies described below to precisely determine gestures. According to the first technology, when touch-up is performed before a time period T counted by a timer exceeds a predetermined time period Tmax, a CPU calculates a variance S of touch positions based on coordinate information on each of touch positions stored in a memory. When calculated variances Sx and Sy are smaller than thresholds Sxmax and Symax respectively, the CPU determines that the input operation does not include a move, that is to say, that the input operation is tap operation. When the calculated variances Sx and Sy are not smaller than the thresholds Sxmax and Symax respectively, the CPU determines that the input operation includes a move, which means that the input operation is drag operation or flick operation (Japanese Laid-open Patent Publication No. 2011-134212).

According to the second technology, even after contact time for input operation performed on an operation surface is acquired, it is checked whether or not an operation object is placed on the operation surface. When the operation object is placed, the input operation is determined to be touch operation. When the operation object is not placed, the input operation is determined to be tap operation (Japanese Laid-open Patent Publication No. 2007-156634).

According to the third technology, a reference speed is set in accordance with a travel distance or a travel time of a pointer such as a stylus and fingers. Based on the reference speed and a travel speed of the pointer, it is determined whether or not flick operation by the pointer is made (Japanese Laid-open Patent Publication No. 2012-128830).

It is difficult for humans to perform the same motion all the time. Even when a user intends to make the same gesture every time, there is no guarantee that a computer determines that the same gesture is made every time. As a result, a device performs processing not intended by the user, which is sometimes disadvantageous to him/her. Such a system is sometimes hard to use for the user.

SUMMARY

The present invention has been achieved in light of such an issue, and an object thereof is to bring more benefits to users of a device performing processing based on a gesture than with the conventional methods.

According to one aspect of the present invention, a device for determining a gesture includes a display portion configured to selectively display one of screens; a storage portion configured to store, for each of the screens, a rule used for distinguishing between gestures; a detection portion configured to detect a motion made by a user; and a determination portion configured to identify, from among the gestures, a gesture represented by the motion detected by the detection portion based on the rule for a current screen, the current screen being one of the screens and being displayed at a time when the motion has been detected.

These and other characteristics and objects of the present invention will become more apparent by the following descriptions of preferred embodiments with reference to drawings.

BRIEF DESCRIPTION OF THE DRAWINGS

FIG. 7 is a diagram showing an example of a job history check screen.

FIG. 13 is a diagram showing an example of a job history check screen before a press gesture is made.

DESCRIPTION OF THE PREFERRED EMBODIMENTS

First Embodiment

Figure 1:
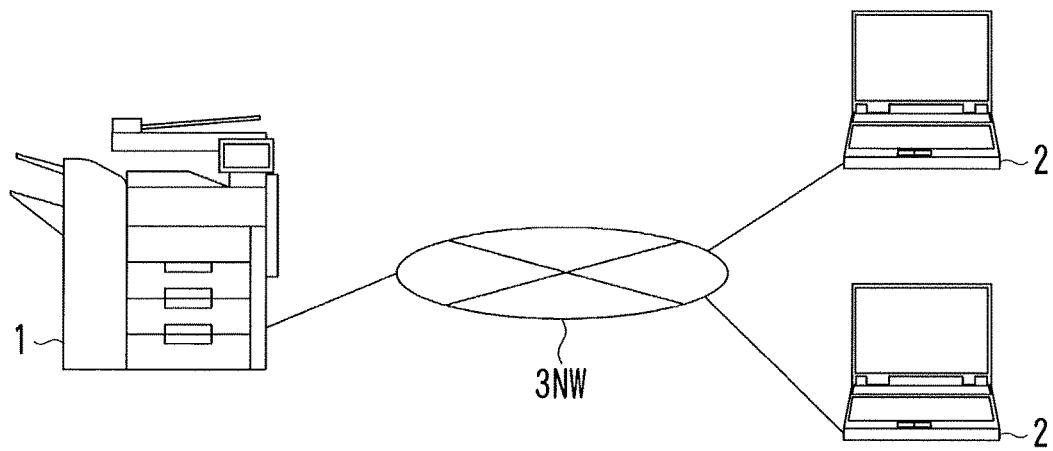
FIG. 1 is a diagram showing an example of the overall configuration of an intranet.
Figure 2:
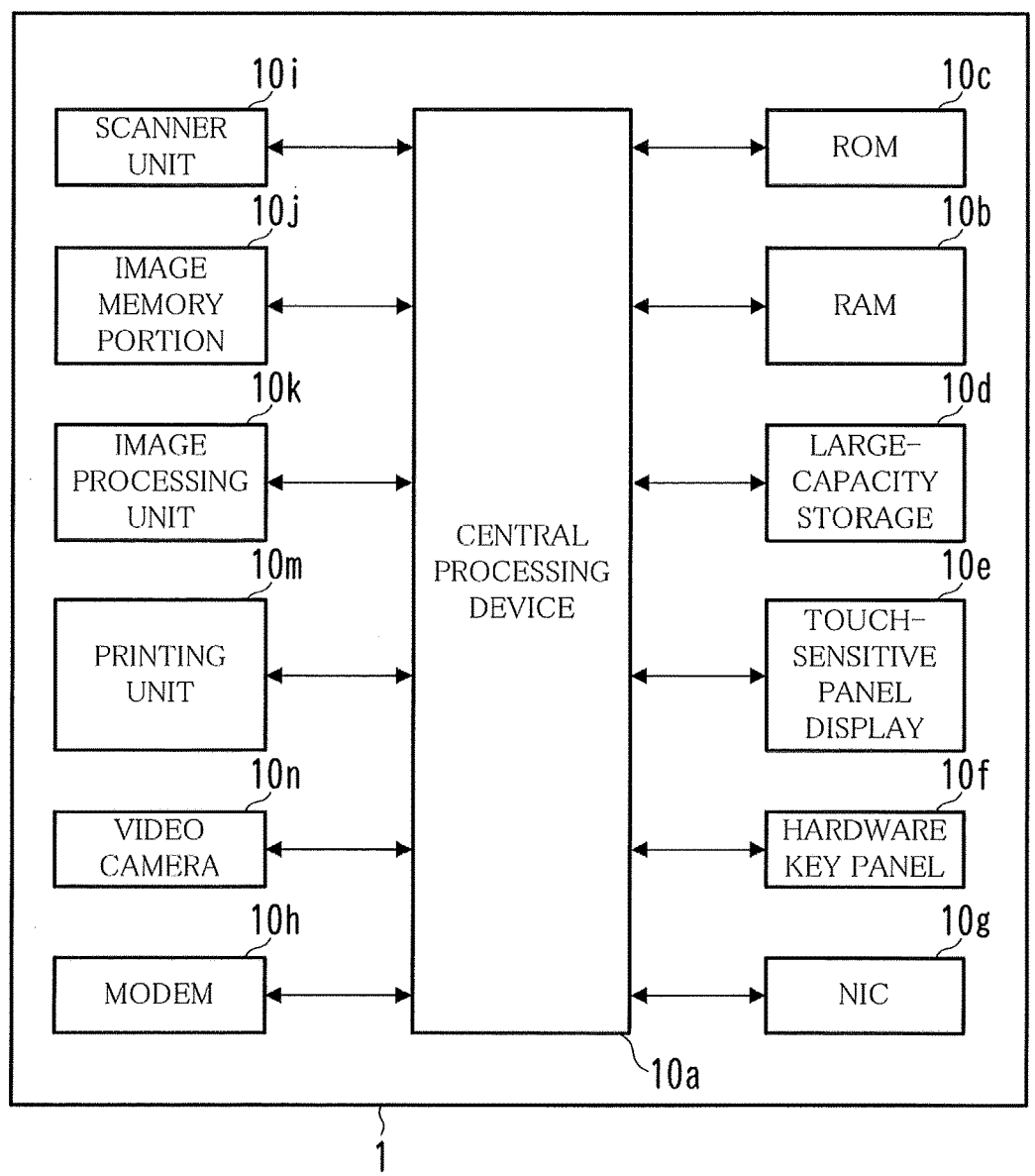
FIG. 2 is a diagram showing an example of the hardware configuration of an image forming apparatus.
Figure 3:
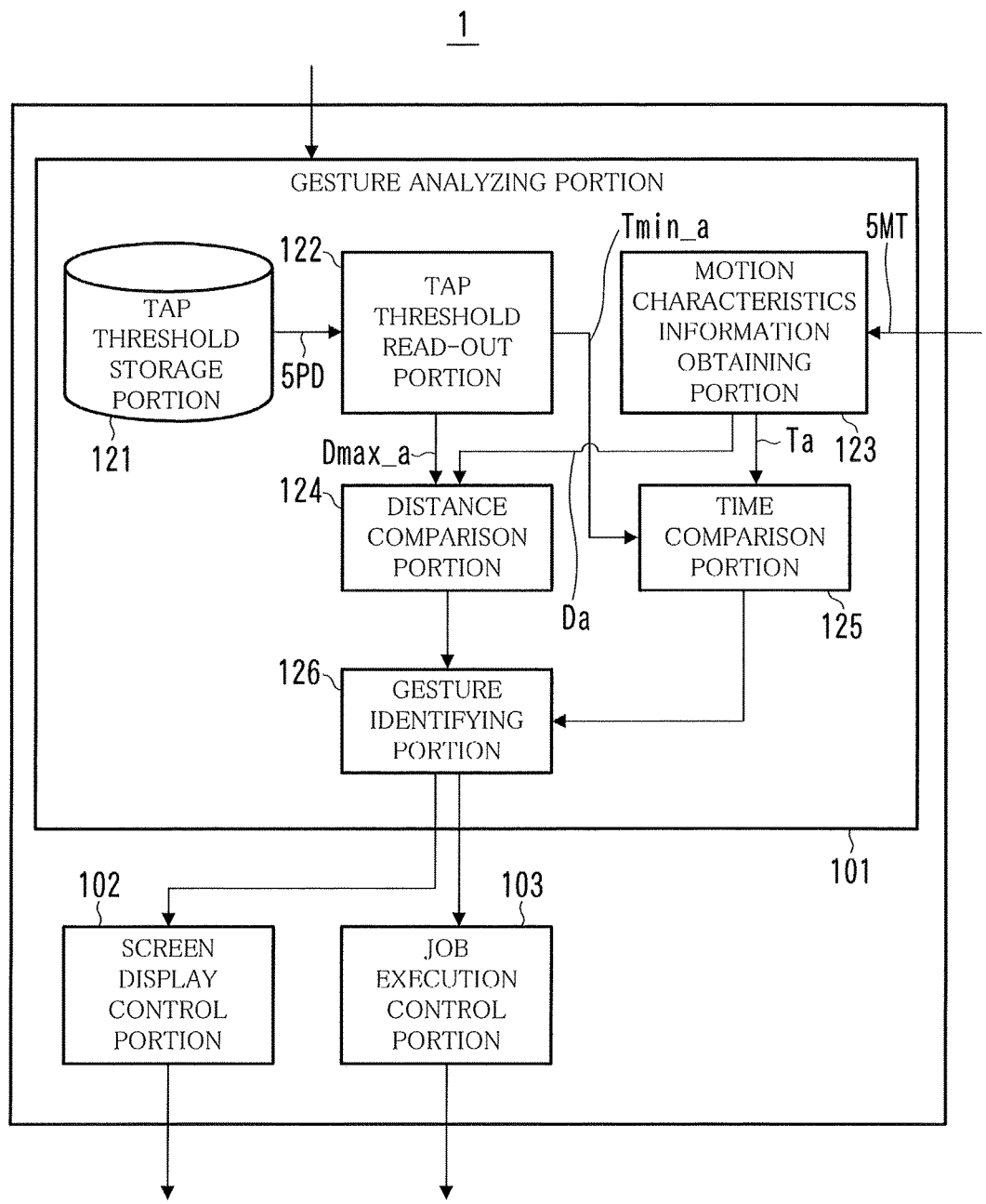
FIG. 3 is a diagram showing an example of the functional configuration of an image forming apparatus.

FIG. 1 is a diagram showing an example of the overall configuration of an intranet 3. FIG. 2 is a diagram showing an example of the hardware configuration of an image forming apparatus 1. FIG. 3 is a diagram showing an example of the functional configuration of the image forming apparatus 1.

As shown in FIG. 1, the intranet 3 is configured of the image forming apparatus 1, terminals 2, a communication line 3NW, and so on. The image forming apparatus 1 is configured to perform communication with the terminals 2 via the communication line 3NW. Examples of the communication line 3NW are a public line, a dedicated line, the Internet, and a Local Area Network (LAN).

The image forming apparatus 1 is an apparatus that is generally called a "Multi-Functional Peripheral (MFP)" or a "multifunction device". The image forming apparatus 1 is an apparatus into which functions such as copying, network printing, scanning, faxing, box function, and a mailer function are consolidated.

The "network printing function" is to print an image onto paper based on image data received from the terminal 2. The network printing function is sometimes called a "network printer function" or "PC print function".

According to the "box function", a storage area called a "box" or "personal box" is allocated to each user. The box function enables each user to save data, e.g., image data, to his/her storage area and to manage the same therein. The box corresponds to a "folder" or "directory" in a personal computer.

Referring to FIG. 2, the image forming apparatus 1 is configured of a central processing device 10a, a Random Access Memory (RAM) 10b, a Read Only Memory (ROM) 10c, a large-capacity storage 10d, a touch-sensitive panel display 10e, a hardware key panel 10f, a Network Interface Card (NIC) 10g, a modem 10h, a scanner unit 10i, an image memory portion 10j, an image processing unit 10k, a printing unit 10m, a video camera 10n, and so on.

The touch-sensitive panel display 10e selectively displays, for example, a screen for presenting messages to a user, a screen for showing the results of processing, and a screen for allowing a user to input data and commands to be given to the image forming apparatus 1. The touch-sensitive panel display 10e detects a position touched by a user and informs the central processing device 10a of the touched position.

The hardware key panel 10f includes a numeric keypad, a start key, a stop key, and a function key.

A user operates the touch-sensitive panel display 10e or the hardware key panel 10f to give commands to the image forming apparatus 1 and enter data thereto. Such commands and data can be entered by, in particular, making touch gestures of tap, press (sometimes called "long tap"), flick, drag, and so on. The touch gestures may be made by touching a display surface of the touch-sensitive panel display 10e with finger and moving the finger in a predetermined manner on the display surface without losing contact.

The NIC 10g performs communication with the terminal 2 and so on in accordance with a protocol such as Transmission Control Protocol/Internet Protocol (TCP/IP).

The modem 10h performs communication with a facsimile terminal in accordance with a protocol such as G3.

The scanner unit 10i optically reads a document image such as text, picture, graphics, or chart recorded on a sheet of paper, and generates image data thereof.

The image memory portion 10j stores the image data captured by the scanner unit 10i. The image memory portion 10j also stores image data received by the NIC 10g or the modem 10h.

The image processing unit 10k performs image processing, e.g., upside down correction, inclination correction, smudge removal, or resolution conversion on the image data stored in the image memory portion 10j.

The printing unit 10m prints, onto paper, a document image based on the image data stored in the image memory portion 10j.

The video camera 10n is a device to record the movement of a user finger, and is used to identify the type of an air gesture. The air gesture is sometimes called a "3D gesture" or "three-dimensional gesture".

The ROM 10c or the large-capacity storage 10d stores, therein, a program for implementing the functions of a gesture analyzing portion 101, a screen display control portion 102, and a job execution control portion 103, all of which are shown in FIG. 3. The program is loaded into the RAM 10b as necessary, and is executed by the central processing device 10a.

The large-capacity storage 10d may be, for example, a hard disk or a non-volatile storage medium such as a Solid State Drive (SSD). The central processing device 10a may be, for example, a Central Processing Unit (CPU) or a Micro Processing Unit (MPU).

The gesture analyzing portion 101 is configured of a tap threshold storage portion 121, a tap threshold read-out portion 122, a motion characteristics information obtaining portion 123, a distance comparison portion 124, a time comparison portion 125, a gesture identifying portion 126, and so on. The gesture analyzing portion 101 determines which gesture user's operation made on the touch-sensitive panel display 10e corresponds to.

In particular, according to the first embodiment, the gesture analyzing portion 101 determines whether a touch gesture represented by operation (motion) on the touch-sensitive panel display 10e is tap or flick. The determination is made based on conditions corresponding to a screen displayed at a time when the motion was made. Hereinafter, such a screen is referred to as a "current screen".

The terminal 2 shown in FIG. 1 is a client with which a user uses functions provided by the image forming apparatus 1. Examples of the terminal 2 are a personal computer, a smartphone, a tablet computer, and a mobile phone terminal.

The description goes on to functions of the portions of the gesture analyzing portion 101 in the image forming apparatus 1 shown in FIG. 3 with reference to flowcharts, and so on.

Figure 4:
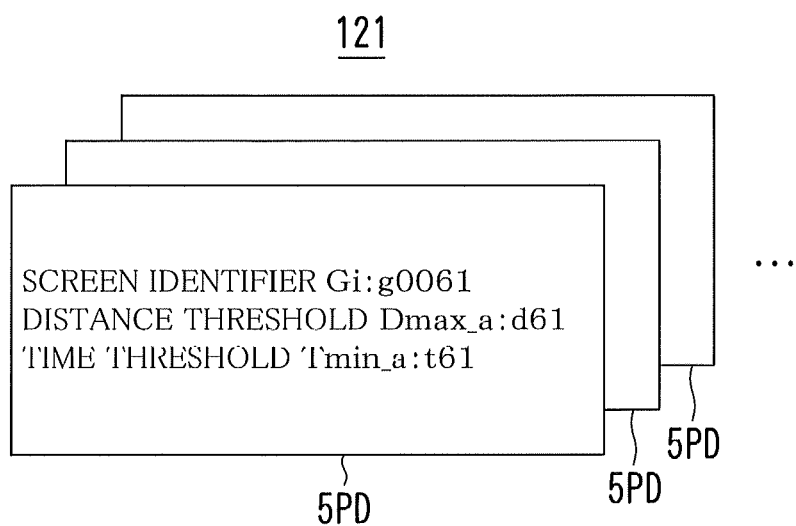
FIG. 4 is a diagram showing an example of tap threshold data.
Figure 5:
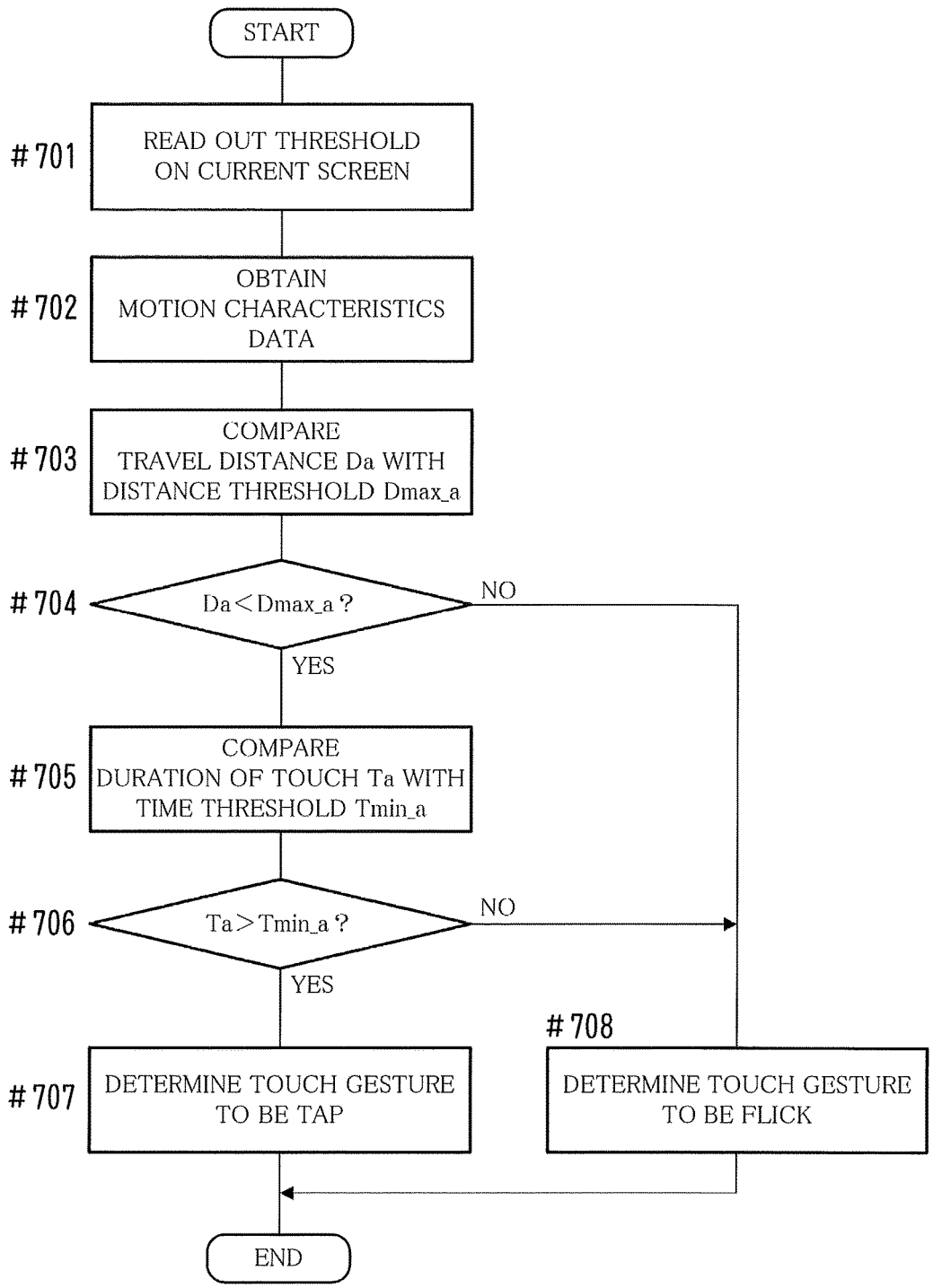
FIG. 5 is a flowchart depicting an example of the flow of processing for distinguishing between tap and flick.
Figure 6:
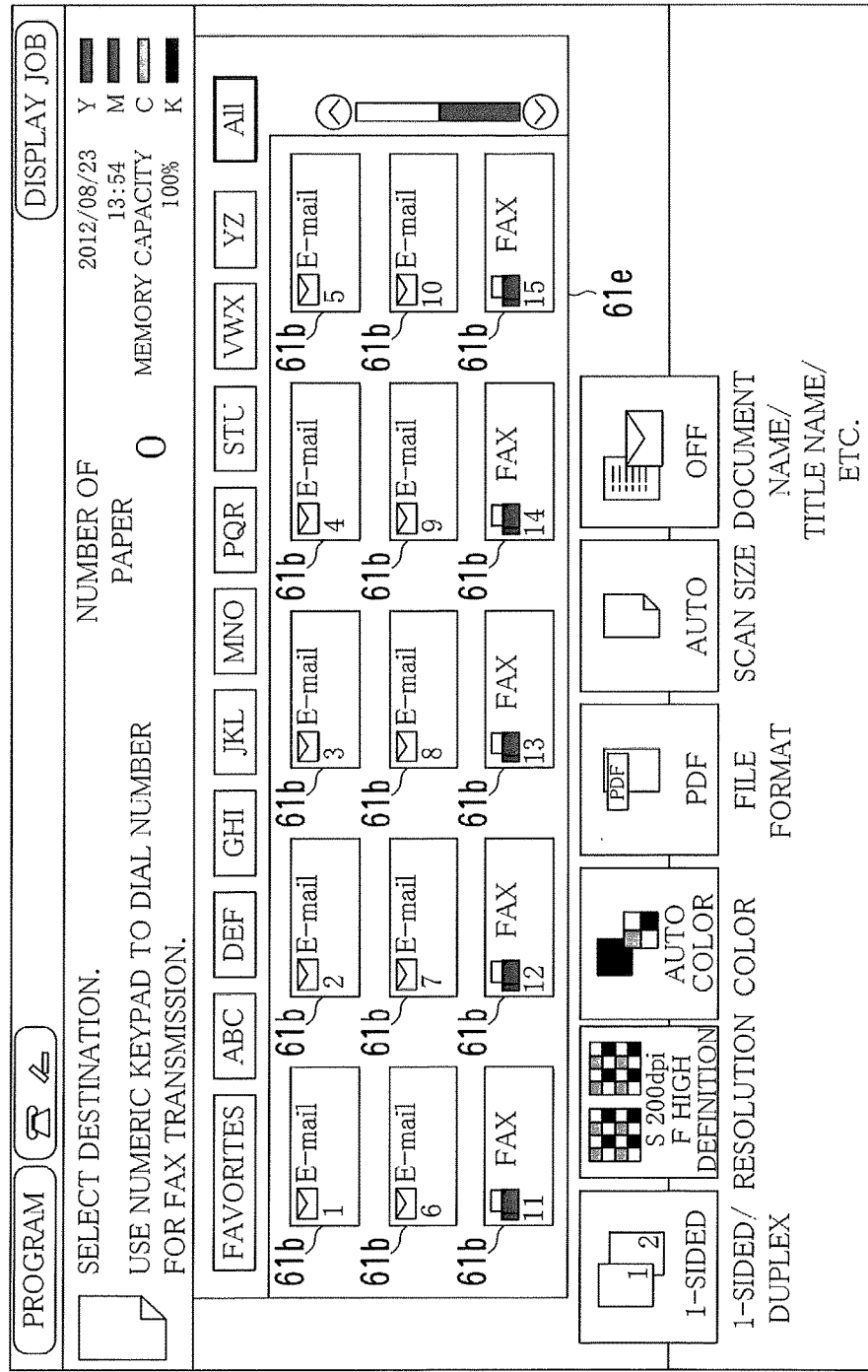
FIG. 6 is a diagram showing an example of a document transmission screen.
Figure 8A:
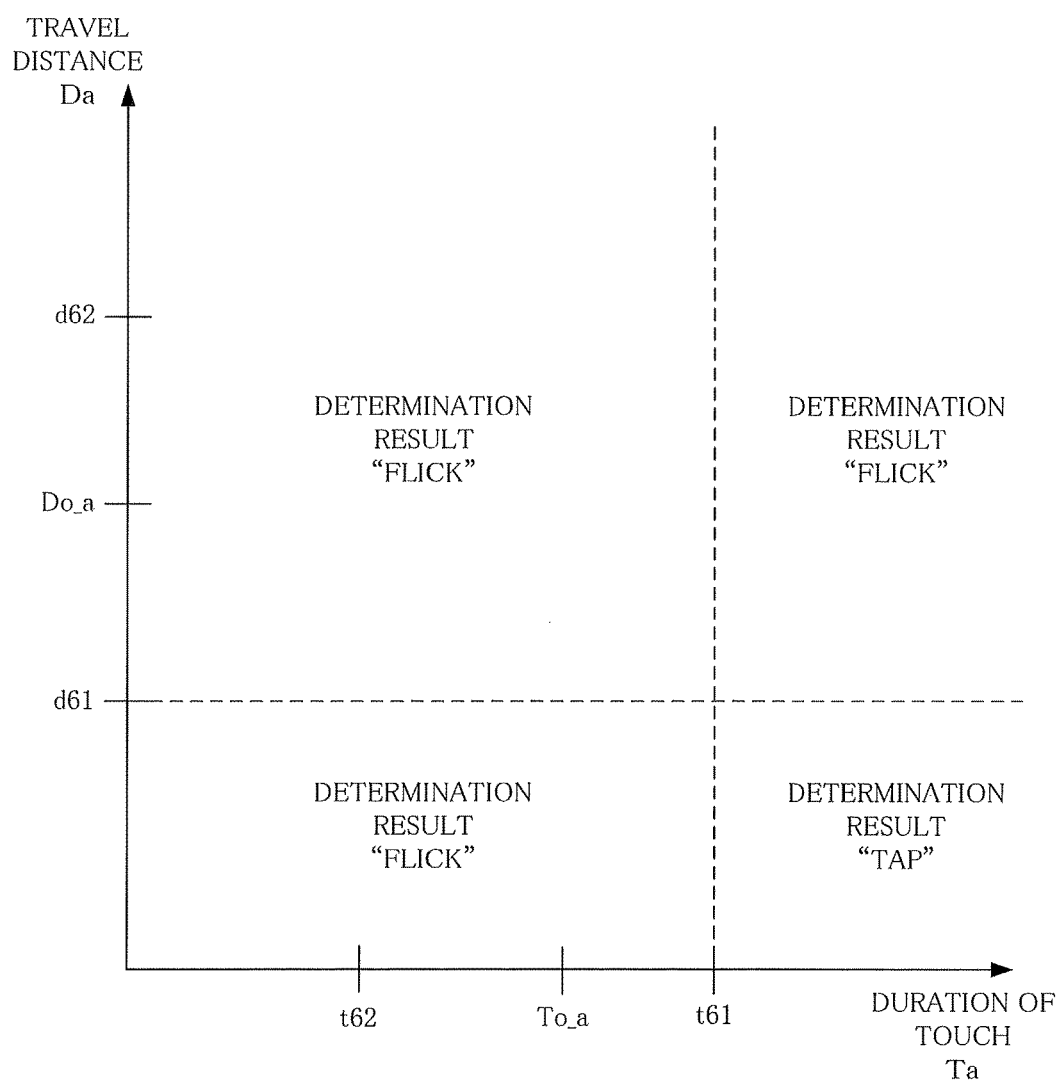
FIGS. 8A and 8B are diagrams showing an example of the determination result of tap and the determination result of flick on a screen-by-screen basis.
Figure 8B:
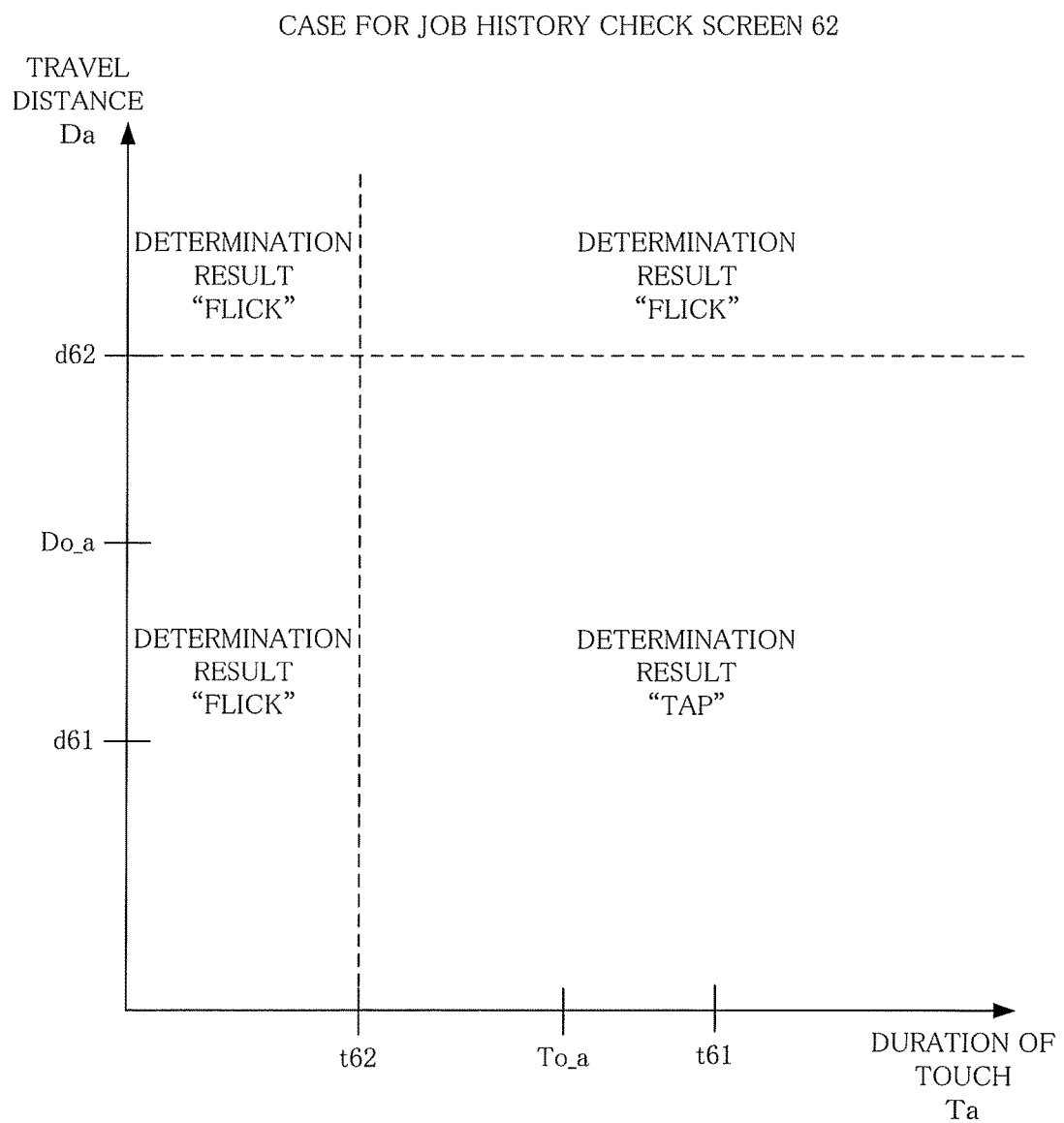

FIG. 4 is a diagram showing an example of tap threshold data 5PD. FIG. 5 is a flowchart depicting an example of the flow of processing for distinguishing between tap and flick. FIG. 6 is a diagram showing an example of a document transmission screen 61. FIG. 7 is a diagram showing an example of a job history check screen 62. FIGS. 8A and 8B are diagrams showing an example of the determination result of tap and the determination result of flick on a screen-by-screen basis.

As shown in FIG. 4, the tap threshold storage portion 121 stores, therein, tap threshold data 5PD on a screen-by-screen basis. The tap threshold data 5PD indicates a screen identifier Gi, a distance threshold Dmax_a, and a time threshold Tmin_a.

The screen identifier Gi is an identifier for identifying a screen. The distance threshold Dmax_a and the time threshold Tmin_a are thresholds used to distinguish between tap and flick.

When the touch-sensitive panel display 10*e* detects a touch with one finger, the tap threshold read-out portion 122 through the gesture identifying portion 126 perform processing in a manner as shown in FIG. 5.

The tap threshold read-out portion 122 reads out tap threshold data 5PD on the current screen from the tap threshold storage portion 121 (Step #701).

The motion characteristics information obtaining portion 123 obtains motion characteristics data 5MT indicating a period of time during which the touch has been made (hereinafter, such a period of time being referred to as a "duration of touch Ta") and a finger movement distance (hereinafter, referred to as a "travel distance Da") based on the result of detection of the touch by the touch-sensitive panel display 10*e*.

The distance comparison portion 124 compares the travel distance Da indicated in the motion characteristics data 5MT with a distance threshold Dmax_a indicated in the tap threshold data 5PD, and judges whether or not the travel distance Da is smaller than the distance threshold Dmax_a (Step #703).

If the travel distance Da is smaller than the distance threshold Dmax_a (Yes in Step #704), then the time comparison portion 125 compares the duration of touch Ta indicated in the motion characteristics data 5MT with a time threshold Tmin_a indicated in the tap threshold data 5PD, and judges whether not the duration of touch Ta is greater than the time threshold Tmin_a (Step #705).

The gesture identifying portion 126 determines a touch gesture represented by the motion on the touch-sensitive panel display 10*e* in accordance with the results of determination by the distance comparison portion 124 and the time comparison portion 125. The gesture identifying portion 126 determines as follows: If the travel distance Da is smaller than the distance threshold Dmax_a, and at the same time, if the duration of touch Ta is greater than the time threshold Tmin_a (Yes in Step #706), then the gesture identifying portion 126 determines that the touch gesture represented by the motion is tap (Step #707). On the other hand, if the travel distance Da is equal to or greater than the distance threshold Dmax_a (No in Step #704), or, alternatively, if the duration of touch Ta is equal to or smaller than the time threshold Tmin_a (No in Step #706), then the gesture identifying portion 126 determines that the touch gesture represented by the motion is flick (Step #708).

The description goes on to a difference between the determination results of touch gestures while a comparison is made between a case where the document transmission screen 61 shown in FIG. 6 is displayed and a case where the job history check screen 62 shown in FIG. 7 is displayed.

The document transmission screen 61 is used for a user to enter conditions and commands for a document transmission job. The "document transmission job" is a job of reading a document image from paper, converting the document image into electronic data, and sending the resultant to a destination designated by a user via facsimile or electronic mail.

The document transmission screen 61 has a destination designation area 61*e*. The destination designation area 61*e* has select buttons 61*b* corresponding to electronic mail addresses and facsimile numbers registered in advance in an address book. When the address book has many records of electronic mail addresses and facsimile numbers, the select buttons 61*b* for all the records cannot be laid out at one time in the destination designation area 61*e*. In such a case, only some of the select buttons 61*b* (fifteen buttons in the illustrated example of FIG. 6) are laid out. In response to a predetermined touch gesture, the destination designation area 61*e* is scrolled through, so that the other select buttons 61*b* are laid out in order in the destination designation area 61*e*.

The user flicks the surface at any position in the destination designation area 61*e*, which causes the destination designation area 61*e* to be scrolled. The user can select an electronic mail address or a facsimile number to which a target document is to be sent by tapping a select button 61*b* corresponding to the electronic mail address or the facsimile number.

While the user considers to have made a flick gesture, the image forming apparatus 1 possibly detects that a select button 61*b* was tapped. This situation is not preferable because if the user does not find the incorrect detection by the image forming apparatus 1, the target document is inadvertently sent to an unintended recipient. In comparison with the situation, the following is less undesirable: When the user considers to have made a tap gesture, the image forming apparatus 1 erroneously detects that a flick gesture was made.

For a tap gesture, in essence, the user should keep touching only one position on the touch-sensitive panel display. However, even if the touch position changes by a distance corresponding to even one dot, the gesture is regarded as flick rather than tap, which makes it difficult for the user to make a tap gesture. To address this, in general, a standard value (maximum value) of change in position tolerated as tap is preset. Hereinafter, the maximum value is referred to as a "distance default maximum value Do_a".

In general, a period of time during which the touch-sensitive panel display is touched is longer for a flick gesture than for a tap gesture. Hereinafter, a preset intermediate value between a typical length of time period during which the touch-sensitive panel display is touched for a tap gesture and a typical length of time period during which the touch-sensitive panel display is touched for a flick gesture is referred to as a "time default minimum value To_a".

For the reasons set forth above, while the document transmission screen 61 is displayed, a tendency in which a gesture made by the user is determined to be flick is preferably higher than usual.

In view of this, a value smaller than the distance default maximum value Do_a is preset, as the distance threshold Dmax_a, in the tap threshold data 5PD (see FIG. 4) for the document transmission screen 61. Further, a value greater than the time default minimum value To_a is preset as the time threshold Tmin_a.

Hereinafter, the distance threshold Dmax_a and the time threshold Tmin_a for the document transmission screen 61 are a "distance threshold d61" and a "time threshold t61", respectively.

In contrast, FIG. 7 shows the job history check screen 62 on which the user checks a history of jobs executed previously by the image forming apparatus 1.

The job history check screen 62 has a job list area 62e in which select buttons 62b corresponding to jobs are provided in descending order from the newest job to the oldest job. When there are many job records, the select buttons 62b for all the job records cannot be laid out at one time in the job list area 62e. In such a case, only some of the select buttons 62b (seven buttons in the example of FIG. 7) are laid out. In response to predetermined operation, the job list area 62e is scrolled through, so that the other select buttons 62b are laid out in order in the job list area 62e.

The user flicks upwardly or downwardly the surface at any position in the job list area 62e, which causes the job list area 62e to be scrolled. In order to display a screen showing the details of attributes of a job (execution conditions, command source, etc.), the user taps a select button 62b corresponding to the job.

The user usually checks the details of a new job rather than an old job. Accordingly, a tap gesture is probably made more often than a flick gesture on the job history check screen 62.

In view of this, a value greater than the distance threshold Dmax_a indicated in the tap threshold data 5PD for the document transmission screen 61 (namely, the distance threshold d61) is set, as distance threshold Dmax_a, in tap threshold data 5PD for the job history check screen 62. Alternatively, it is possible to set a value greater than the distance default maximum value Do_a.

A value smaller than the time threshold Tmin_a indicated in the tap threshold data 5PD for the document transmission screen 61 (namely, the time threshold t61) is set, as time threshold Tmin_a, in the tap threshold data 5PD for the job history check screen 62. Alternatively, it is possible to set a value smaller than the time default minimum value To_a.

Hereinafter, the distance threshold Dmax_a and the time threshold Tmin_a for the job history check screen 62 are refereed to as a "distance threshold d62" and a "time threshold t62", respectively.

As discussed above, the distance threshold d62 is greater than the distance threshold d61. The time threshold t62 is smaller than the time threshold t61. Therefore, according to the processing shown in FIG. 5, it is more often determined that a gesture made by the user is flick in a case where the document transmission screen 61 is displayed than in a case where the job history check screen 62 is displayed. This is known from the comparison between FIG. 8A and FIG. 8B. Further, it is more often determined that a gesture made by the user is tap in the case where the job history check screen 62 is displayed than in the case where the document transmission screen 61 is displayed. This is also known from the comparison between FIG. 8A and FIG. 8B.

When a screen to which no tap threshold data 5PD is given is displayed, the gesture analyzing portion 101 analyzes what kind of gesture is represented by a motion on the touch-sensitive panel display 10e by conventional methods based on the distance default maximum value Do_a or the time default minimum value To_a. When a screen to which the tap threshold data 5PD is given, i.e., the document transmission screen 61 or the job history check screen 62, is displayed, gestures other than tap and flick are analyzed through the conventional methods.

Referring back to FIG. 3, the screen display control portion 102 and the job execution control portion 103 perform processing based on the gesture determined by the gesture analyzing portion 101 and a target thereof (hereinafter, referred to as "operation details") in the following manner.

The screen display control portion 102 scrolls through or makes a change on the current screen depending on the operation details.

The job execution control portion 103 controls the hardware depicted in FIG. 2 in such a manner that a variety of jobs are executed in accordance with the operation details.

The screen display control portion 102 and the job execution control portion 103 may be implemented by the existing operating system, firmware, or application programs.

According to the first embodiment, it is possible to distinguish between tap and flick on a screen-by-screen basis more appropriately than is conventionally possible. This causes less inconvenience to users than with conventional methods, or, improves the user-friendliness as compared to conventional methods.

Second Embodiment

Figure 9:
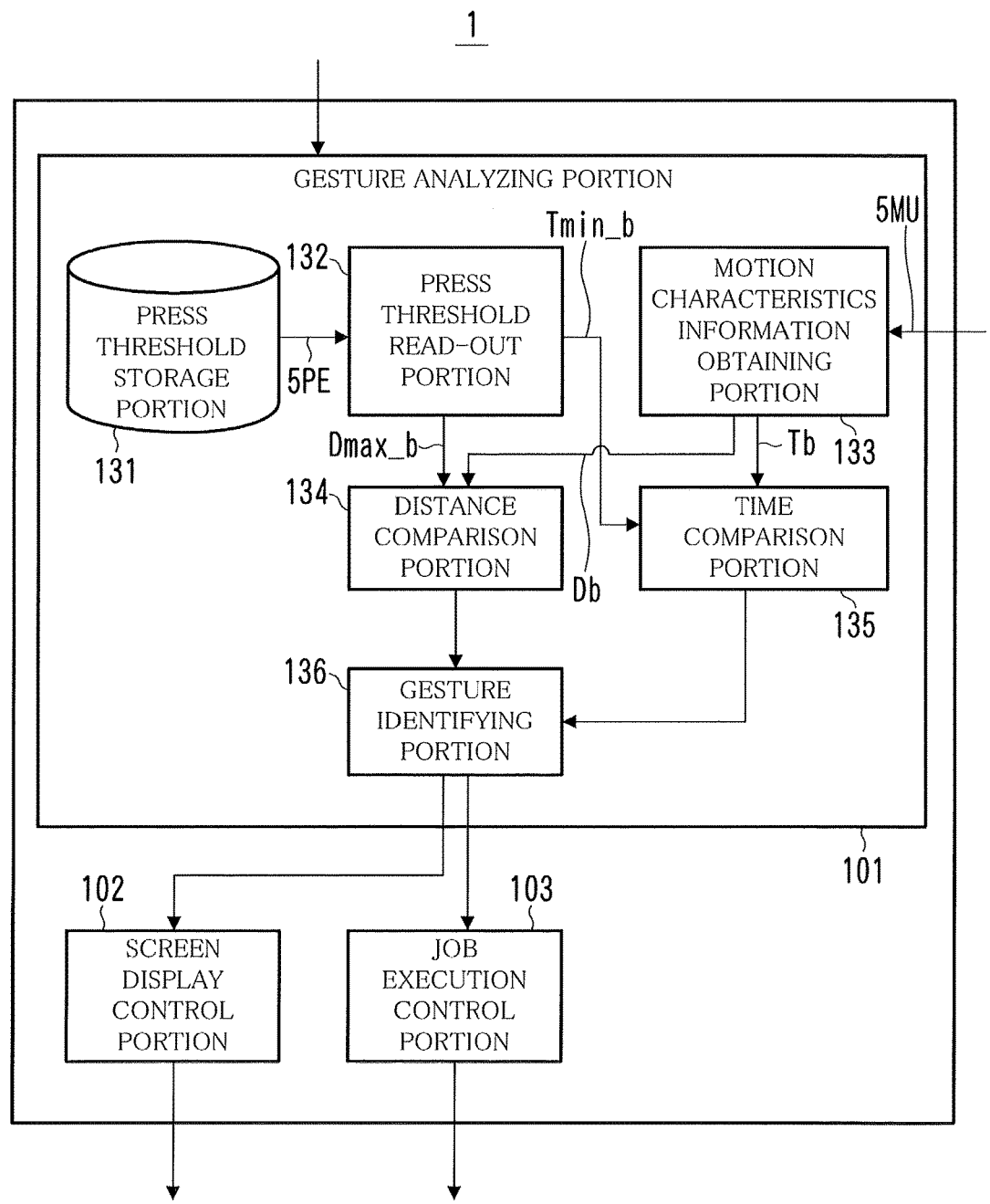
FIG. 9 is a diagram showing a modification of the functional configuration of an image forming apparatus.
Figure 10:
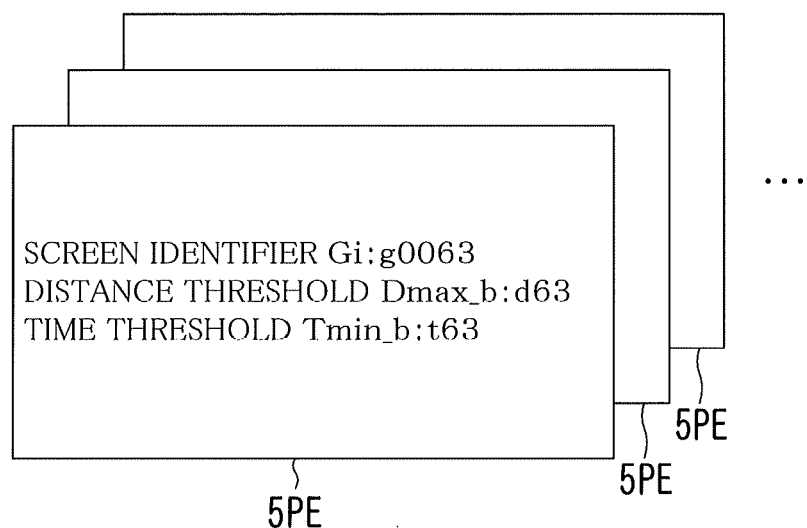
FIG. 10 is a diagram showing an example of press threshold data.
Figure 11:
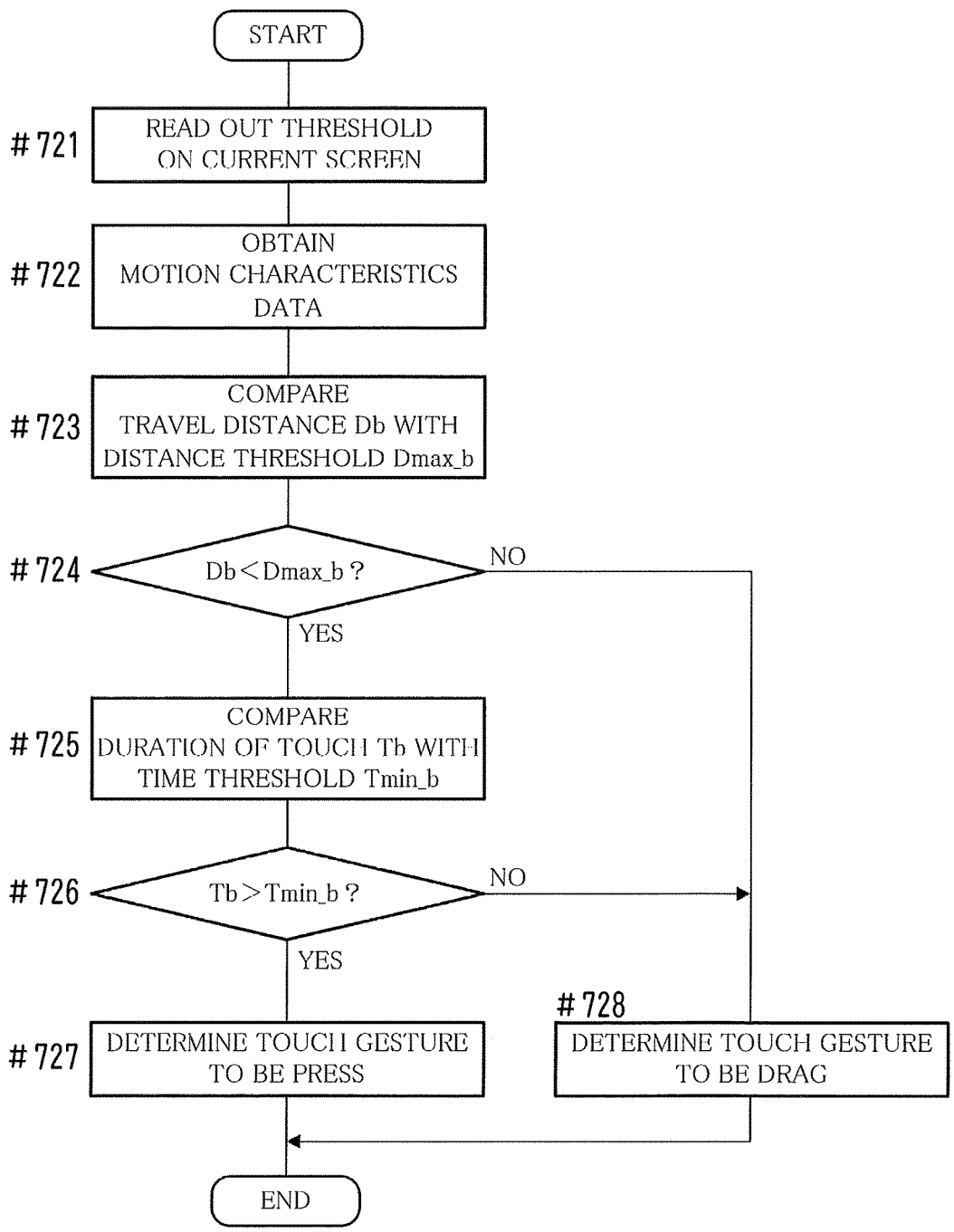
FIG. 11 is a flowchart depicting an example of the flow of processing for distinguishing between press and drag.
Figure 12:
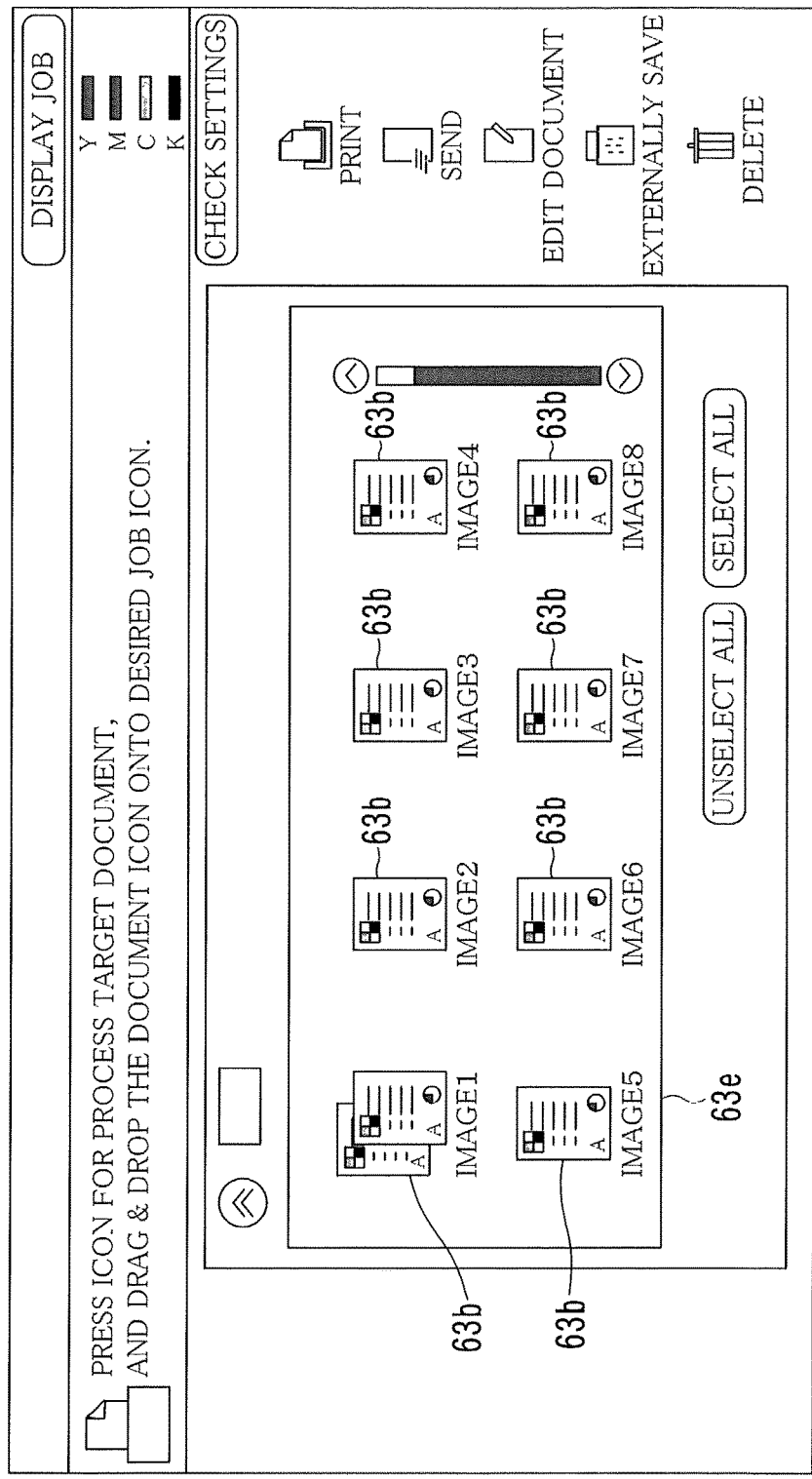
FIG. 12 is a diagram showing an example of a box document output screen before a press gesture is made.
Figure 14:
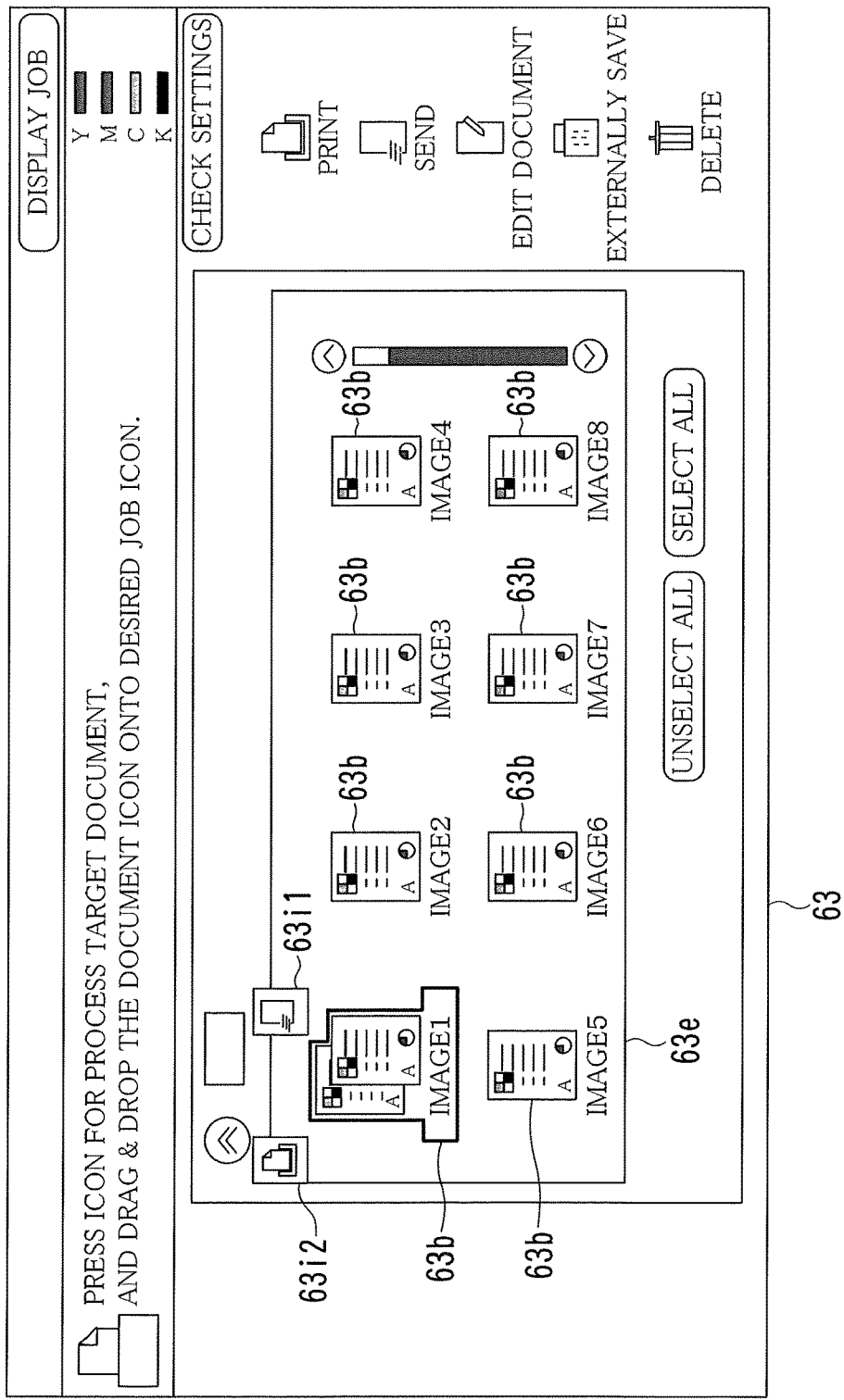
FIG. 14 is a diagram showing an example of a box document output screen after a press gesture is made.
Figure 15:
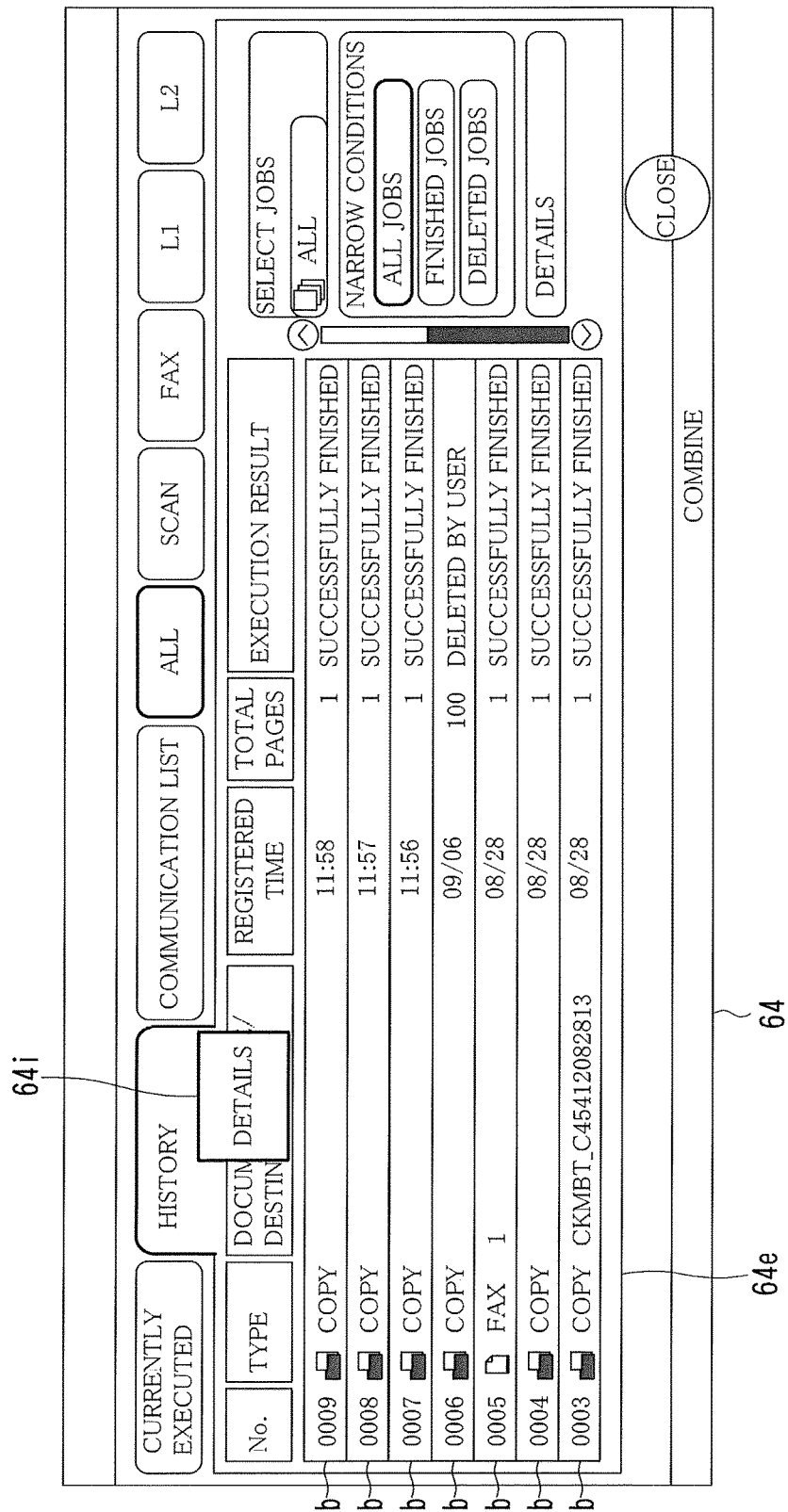
FIG. 15 is a diagram showing an example of a job history check screen after a press gesture is made.
Figure 16A:
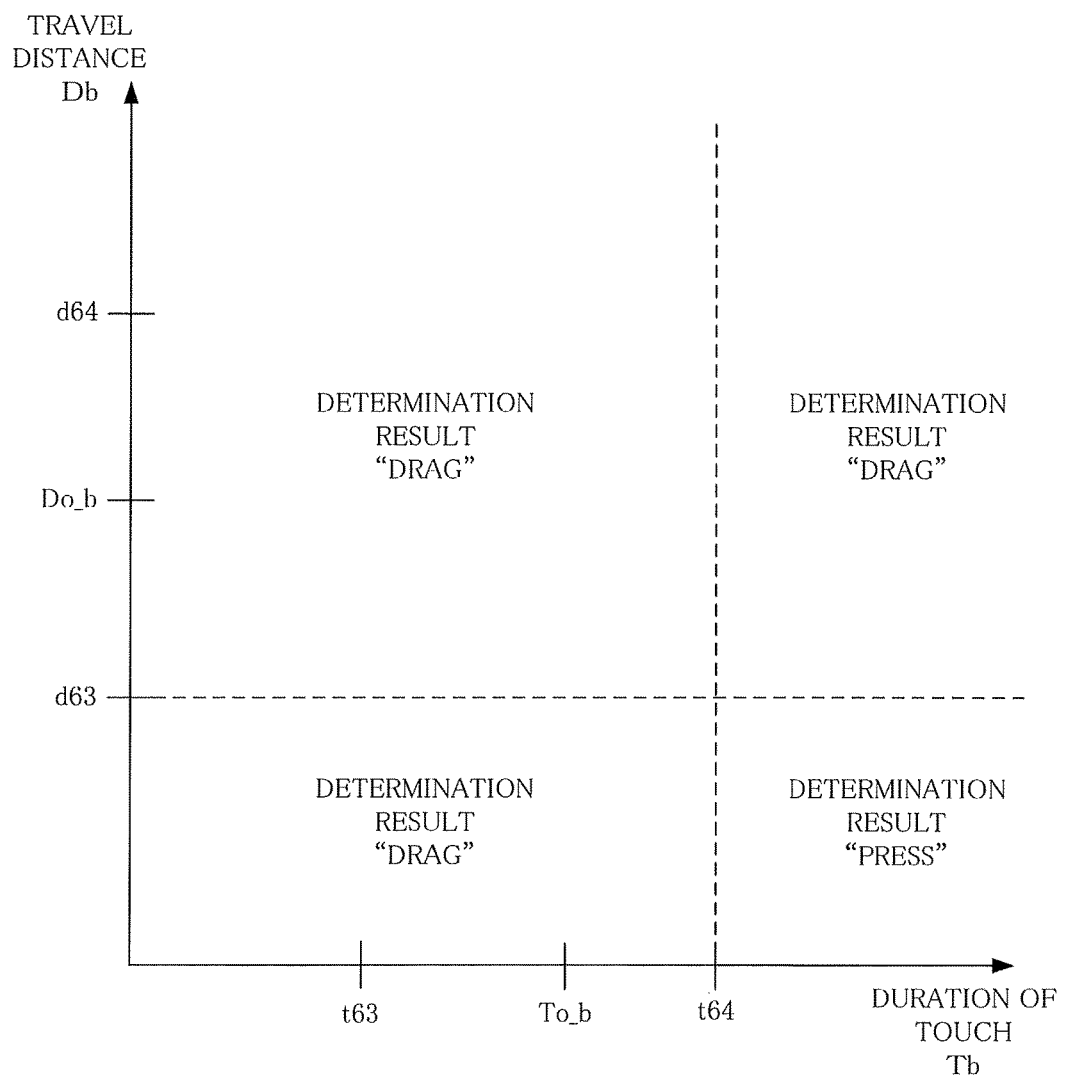
FIGS. 16A and 16B are diagrams showing an example of the determination result of press and the determination result of drag on a screen-by-screen basis.
Figure 16B:
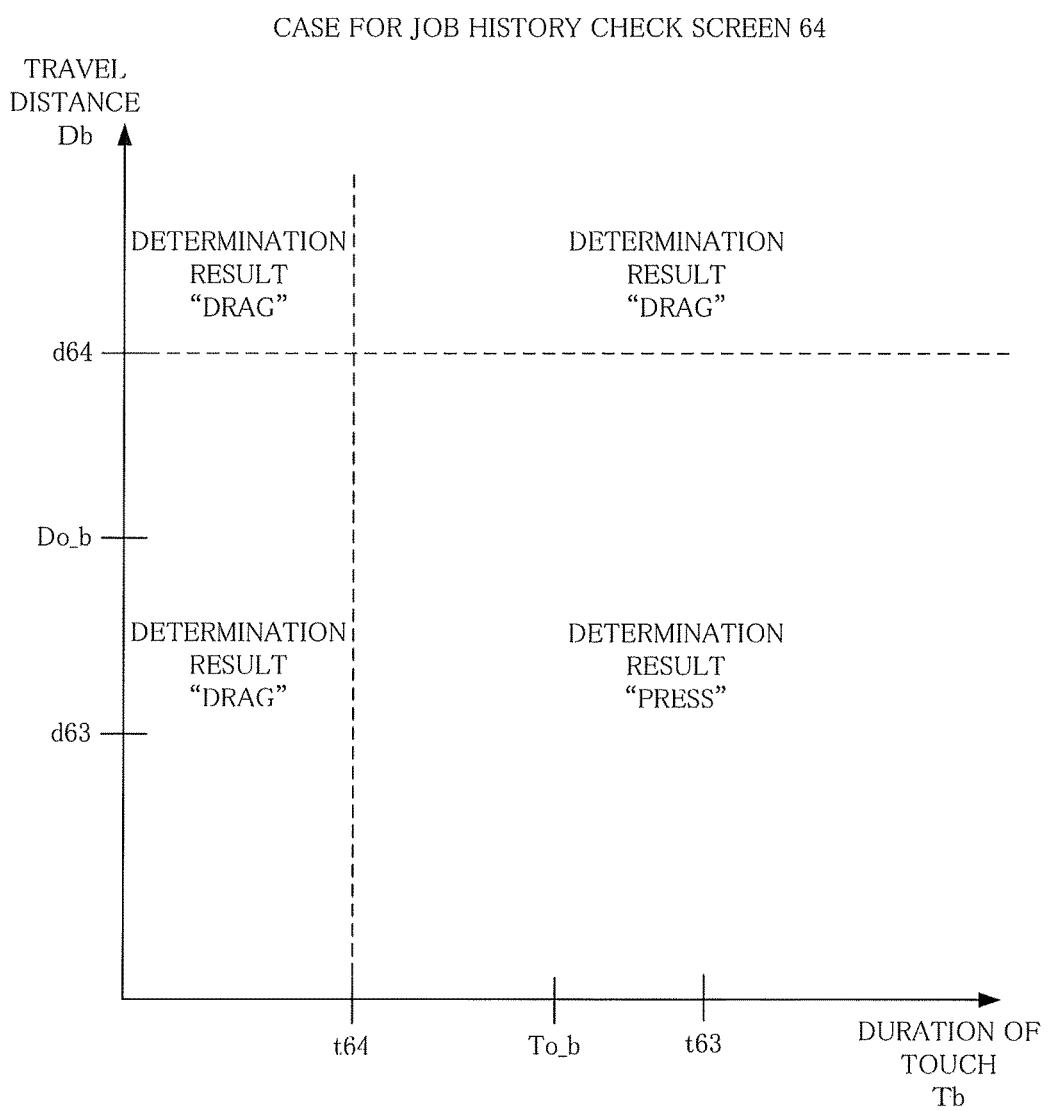

FIG. 9 is a diagram showing a modification of the functional configuration of the image forming apparatus 1. FIG. 10 is a diagram showing an example of press threshold data 5PE. FIG. 11 is a flowchart depicting an example of the flow of processing for distinguishing between press and drag. FIG. 12 is a diagram showing an example of a box document output screen 63 before a press gesture is made. FIG. 13 is a diagram showing an example of a job history check screen 64 before a press gesture is made. FIG. 14 is a diagram showing an example of the box document output screen 63 after a press gesture is made. FIG. 15 is a diagram showing an example of the job history check screen 64 after a press gesture is made. FIGS. 16A and 16B are diagrams showing an example of the determination result of press and the determination result of drag on a screen-by-screen basis.

In the first embodiment, the image forming apparatus 1 determines whether a touch gesture is tap or flick based on thresholds depending on the current screen. In the second embodiment, the image forming apparatus 1 determines whether a touch gesture is press or drag based on thresholds depending on the current screen.

The configuration of the intranet 3 according to the second embodiment is the same as that of the first embodiment shown in FIG. 1. The hardware configuration and functional configuration of the image forming apparatus 1 in the second embodiment are basically the same as those of the first embodiment shown in FIG. 2 and FIG. 3, respectively. Note however that, as shown in FIG. 9, the gesture analyzing portion 101 is configured of a press threshold storage portion 131, a press threshold read-out portion 132, a motion characteristics information obtaining portion 133, a distance comparison portion 134, a time comparison portion 135, a gesture identifying portion 136, and so on.

The description goes on to functions of the portions of the gesture analyzing portion 101 with reference to the flowchart of FIG. 11, and so on. Description of points common to the first embodiment shall be omitted.

As shown in FIG. 10, the press threshold storage portion 131 stores, therein, press threshold data 5PE on a screen-by-screen basis. The press threshold data 5PE indicates a screen identifier Gi, a distance threshold Dmax_b, and a time threshold Tmin_b. The distance threshold Dmax_b and the time threshold Tmin_b are thresholds used to distinguish between press and drag.

When the touch-sensitive panel display be detects a touch with one finger, the press threshold read-out portion 132 through the gesture identifying portion 136 perform processing in a manner as shown in FIG. 11.

The press threshold read-out portion 132 reads out press threshold data 5PE on the current screen from the press threshold storage portion 131 (Step #721).

The motion characteristics information obtaining portion 133 obtains motion characteristics data 5MU indicating a period of time during which the touch has been made (hereinafter, such a period of time being referred to as a "duration of touch Tb") and a finger movement distance (hereinafter, referred to as a "travel distance Db") (Step #722).

The distance comparison portion 134 compares the travel distance Db indicated in the motion characteristics data 5MU with a distance threshold Dmax_b indicated in the press threshold data 5PE, and judges whether or not the travel distance Db is smaller than the distance threshold Dmax_b (Step #723).

If the travel distance Db is smaller than the distance threshold Dmax_b (Yes in Step #724), then the time comparison portion 135 compares the duration of touch Tb indicated in the motion characteristics data 5MU with a time threshold Tmin_b indicated in the press threshold data 5PE, and judges whether or not the duration of touch Tb is greater than the time threshold Tmin_b (Step #725).

The gesture identifying portion 136 identifies the type of a touch gesture represented by the operation (motion) on the touch-sensitive panel display 10e in accordance with the results of determination by the distance comparison portion 134 and the time comparison portion 135. The gesture identifying portion 136 determines as follows: If the travel distance Db is smaller than the distance threshold Dmax_b, and at the same time, if the duration of touch Tb is greater than the time threshold Tmin_b (Yes in Step #726), then the gesture identifying portion 136 determines that the touch gesture represented by the motion is press (Step #727). On the other hand, if the travel distance Db is equal to or greater than the distance threshold Dmax_b (No in Step #724), or, alternatively, if the duration of touch Tb is equal to or smaller than the time threshold Tmin_b (No in Step #726), then the gesture identifying portion 136 determines that the touch gesture represented by the motion is drag (Step #728).

The description goes on to a difference between the determination results of touch gestures while a comparison is made between a case where the box document output screen 63 shown in FIG. 12 is displayed and a case where the job history check screen 64 shown in FIG. 13 is displayed.

The box document output screen 63 is used for a user to enter commands for a box document transmission job or a box document print job. The "box document transmission job" is a job of sending a document saved in the form of image data in a box to another device. The "box document print job" is a job of printing out a document saved in the form of image data in a box onto paper.

The box document output screen 63 has a document designation area 63e. The document designation area 63e has select icons 63b corresponding to documents saved in the form of image data in a box. When many documents are registered, the select icons 63b for all the documents cannot be laid out at one time in the document designation area 63e. In such a case, only some of the select icons 63b (eight icons in the illustrated example of FIG. 12) are laid out. In response to a predetermined touch gesture, the document designation area 63e is scrolled through, so that the other select icons 63b are laid out in order in the document designation area 63e.

The user drags the surface at any position in the document designation area 63e, which causes the document designation area 63e to be scrolled.

The user gives the image forming apparatus 1 a command for a box document transmission job or a command for a box document print job via a press gesture and a drag and drop gesture in the following manner.

The user makes a press gesture on a select icon 63b corresponding to a document to be sent or to be printed. At this time point, however, the user does not release the finger from the touch-sensitive panel display 10e. In short, the user keeps touching the select icon 63b for a predetermined period of time or longer. In response to this operation, as shown in FIG. 14, two job icons 63i1 and 63i2 appear in un upper part of the document designation area 63e. The job icon 63i1 corresponds to a box document transmission job. The job icon 63i2 corresponds to a box document print job. In order to give a command to execute a box document transmission job, the user drags and drops the select icon 63b onto the job icon 63i1. In order to give a command to execute a box document print job, the user drags and drops the select icon 63b onto the job icon 63i2.

When the select icon 63b is dropped onto the job icon 63i1, image data on a document corresponding to the select icon 63b is sent to another device. On the other hand, when the select icon 63b is dropped onto the job icon 63i2, a document corresponding to the select icon 63b is printed onto paper.

While the user considers to have only made a drag gesture, the image forming apparatus 1 possibly detects that a select icon 63b was pressed, and then, dragged. This situation is not preferable. This is because the target document is possibly sent to an unintended recipient inadvertently, or, unnecessary printing is possibly carried out. In comparison with the situation, the following is less undesirable: When the user considers to have made a press gesture, and then have made a drag gesture, the image forming apparatus 1 erroneously detects that only a drag gesture was made.

For a press gesture, in essence, as with the case of a tap gesture, the user should keep touching only one position on the touch-sensitive panel display. However, even if the touch position changes by a distance corresponding to even one dot, the gesture is regarded as drag rather than press, which makes it difficult for the user to make a press gesture. To address this, in general, a standard value (maximum value) of change in position tolerated as press is preset. Hereinafter, the maximum value is referred to as a "distance default maximum value Do_b".

In general, a period of time during which the touch-sensitive panel display is touched is longer for a drag gesture than for a press gesture. Hereinafter, a preset intermediate value between a typical length of time period during which the touch-sensitive panel display is touched for a press gesture and a typical length of time period during which the touch-sensitive panel display is touched for a drag gesture is referred to as a "time default minimum value To_b".

For the reasons set forth above, while the box document output screen 63 is displayed, a tendency in which a gesture represented by user motion is determined to be only a drag gesture rather than a combined gesture of press and drag is preferably higher than usual.

In view of this, a value smaller than the distance default maximum value Do_b is preset, as the distance threshold Dmax_b, in the press threshold data 5PE (see FIG. 10) for the box document output screen 63. Further, a value greater than the time default minimum value To_b is preset as the time threshold Tmin_b.

Hereinafter, the distance threshold Dmax_b and the time threshold Tmin_b for the box document output screen 63 are a "distance threshold d63" and a "time threshold t63", respectively.

In contrast, FIG. 13 shows the job history check screen 64 on which the user checks a history of jobs executed previously by the image forming apparatus 1 as with the job history check screen 62 (refer to FIG. 7).

The configuration of the job history check screen 64 is basically the same as that of the job history check screen 62. To be specific, the job history check screen 64 has a job list area 64e in which select buttons 64b corresponding to jobs are provided in descending order from the newest job to the oldest job. When there are many job records, only some of the select buttons 64b are laid out. In response to predetermined operation, the job list area 64e is scrolled through, so that the other select buttons 64b are laid out in order in the job list area 64e.

Note that a gesture for scrolling through the job list area 64e and a gesture for selecting a job are different from those on the job history check screen 62.

The user drags upwardly or downwardly the surface at any position in the job list area 64e, which causes the job list area 64e to be scrolled.

In order to display a screen showing job details, the user performs the following operation.

The user makes a press gesture with a finger on a select button 64b corresponding to a job of which the details are to be checked. At this time point, however, the user does not release the finger from the touch-sensitive panel display 10e. In short, the user keeps touching the select button 64b for a predetermined period of time or longer. In response to this operation, as shown in FIG. 15, a details icon 64i appears in an upper part of the job list area 64e. The user drags and drops the select button 64b onto the details icon 64i.

As described above, the user usually checks the details of a new job rather than an old job. Accordingly, a combined gesture of press and drag is probably made more often than a press gesture only on the job history check screen 64.

In view of this, a value greater than the distance threshold Dmax_b indicated in the press threshold data 5PE for the box document output screen 63 (namely, the distance threshold d63) is set, as distance threshold Dmax_b, in press threshold data 5PE for the job history check screen 64. Alternatively, it is possible to set a value greater than the distance default maximum value Do_b.

A value smaller than the time threshold Tmin_b indicated in the press threshold data 5PE for the box document output screen 63 (namely, the time threshold t63) is set, as time threshold Tmin_b, in the press threshold data 5PE for the job history check screen 64. Alternatively, it is possible to set a value smaller than the time default minimum value To_b.

Hereinafter, the distance threshold Dmax_b and the time threshold Tmin_b for the job history check screen 64 are refereed to as a "distance threshold d64" and a "time threshold t64", respectively.

As discussed above, the distance threshold d64 is greater than the distance threshold d63. The time threshold t64 is smaller than the time threshold t63. Therefore, according to the processing shown in FIG. 11, it is more often determined that a gesture made by the user is drag in a case where the box document output screen 63 is displayed than in a case where the job history check screen 64 is displayed. This is known from the comparison between FIG. 16A and FIG. 16B. Further, it is more often determined that a gesture made by the user is tap in the case where the job history check screen 64 is displayed than in the case where the box document output screen 63 is displayed. This is also known from the comparison between FIG. 16A and FIG. 16B.

Referring back to FIG. 9, the screen display control portion 102 and the job execution control portion 103 operate in a manner similar to those in the first embodiment. Note that, as the result of determination of the touch gesture, the result of determination by the gesture identifying portion 136 is used.

According to the second embodiment, it is possible to distinguish between press and drag on a screen-by-screen basis more appropriately than is conventionally possible. This causes less inconvenience to users than with conventional methods, or, improves the user-friendliness as compared to conventional methods.

Third Embodiment

Figure 17:
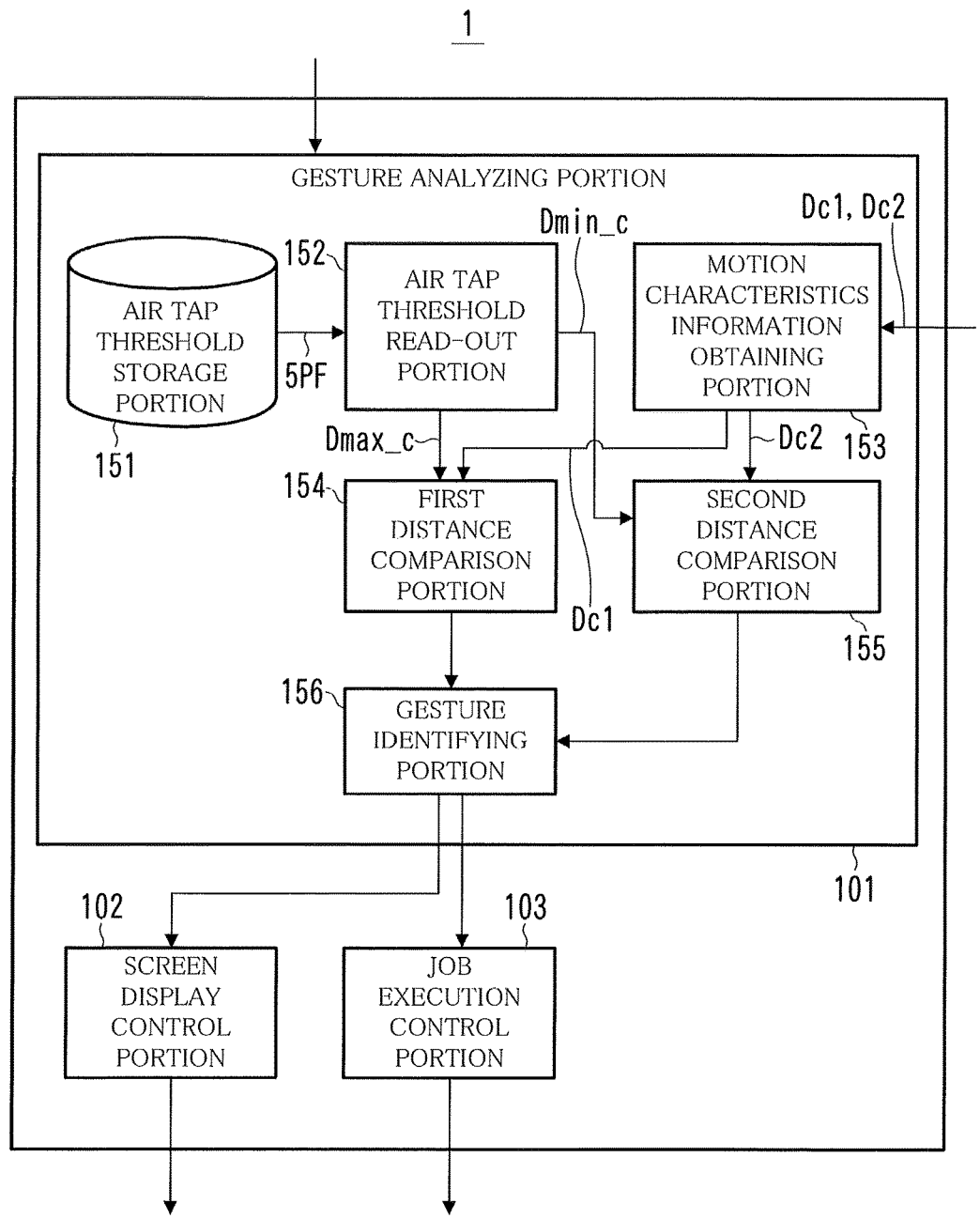
FIG. 17 is a diagram showing a modification of the functional configuration of an image forming apparatus.
Figure 18:
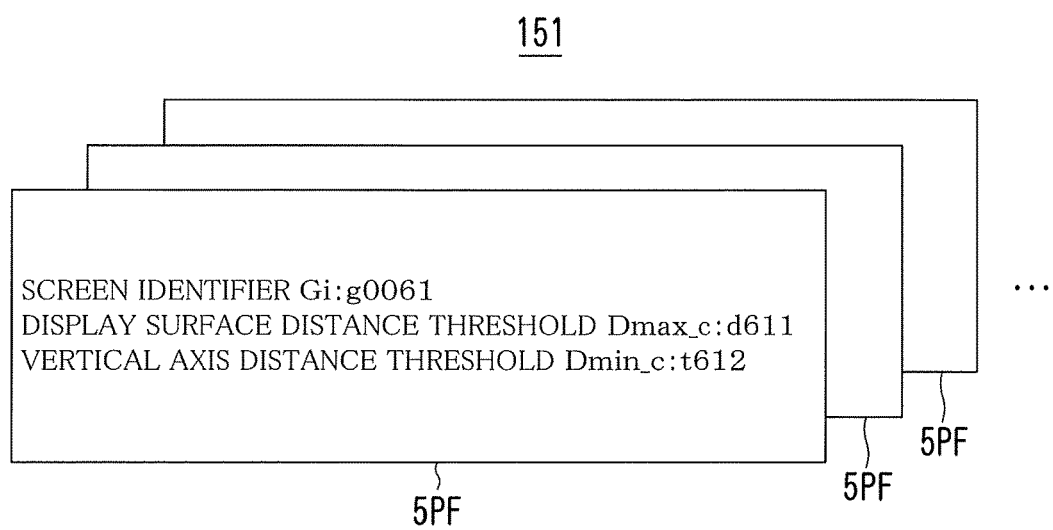
FIG. 18 is a diagram showing an example of air tap threshold data.
Figure 19:
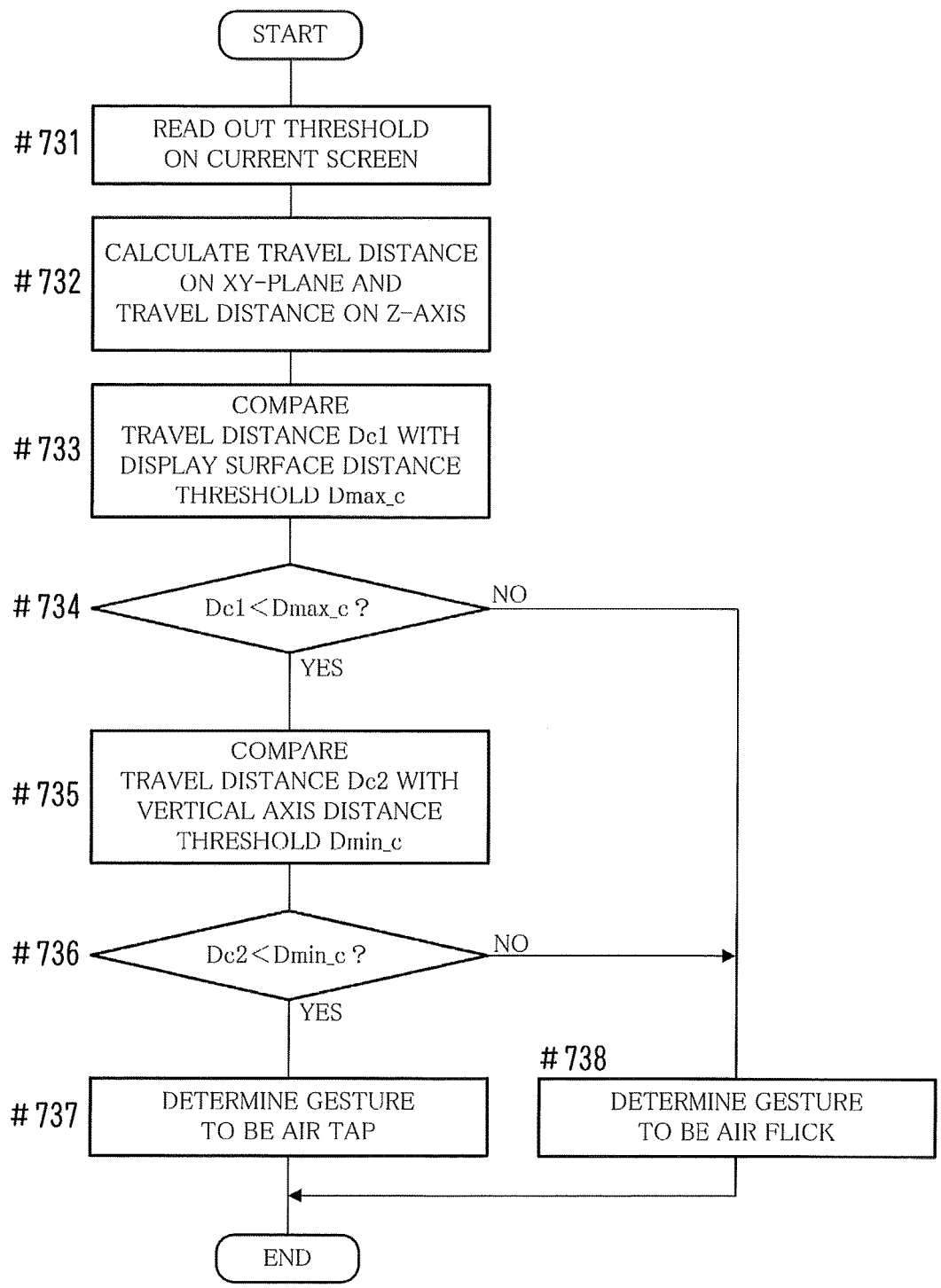
FIG. 19 is a flowchart depicting an example of the flow of processing for distinguishing between air tap and air flick.
Figure 20A:
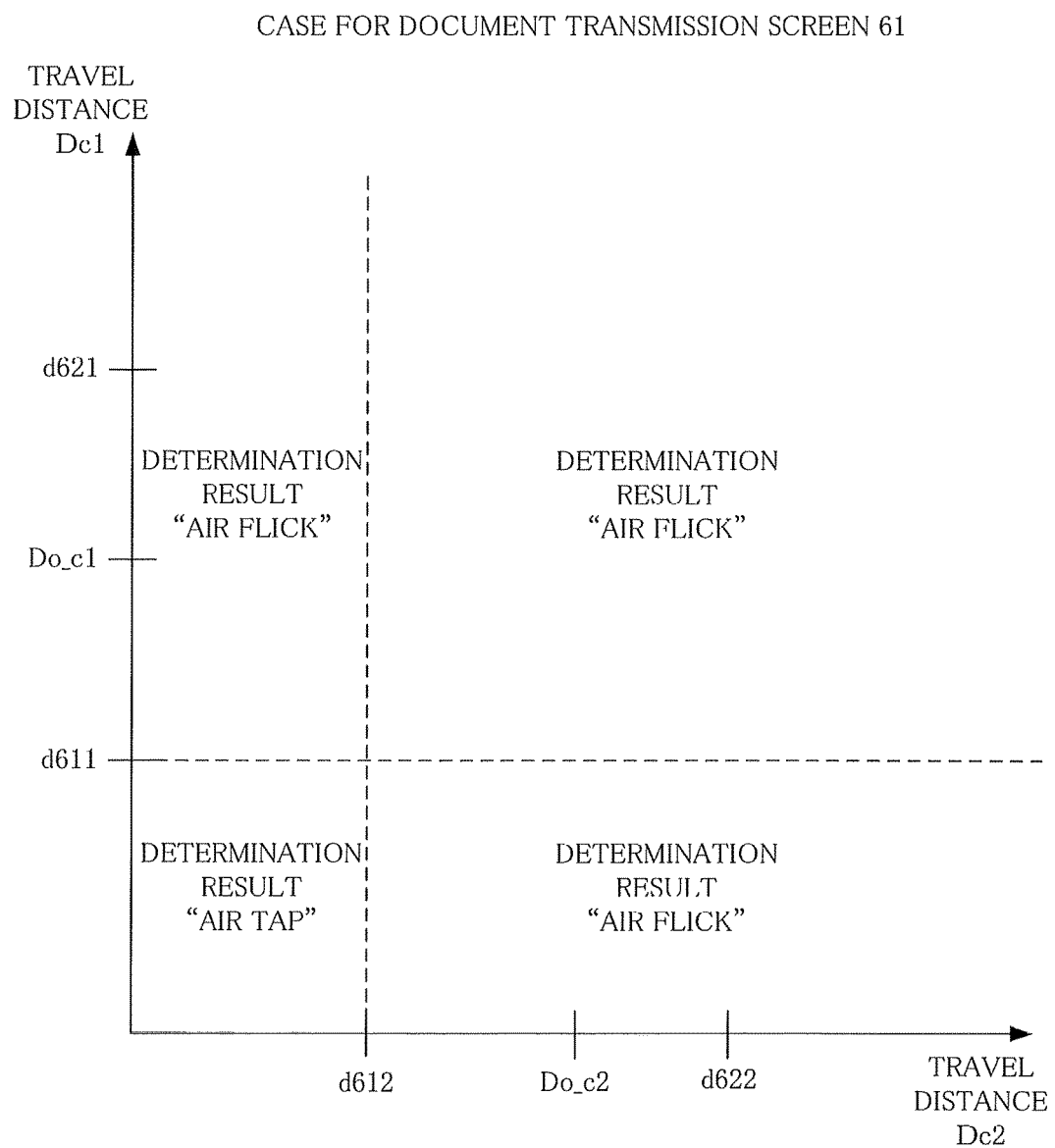
FIGS. 20A and 20B are diagrams showing an example of the determination result of air tap and the determination result of air flick on a screen-by-screen basis.
Figure 20B:
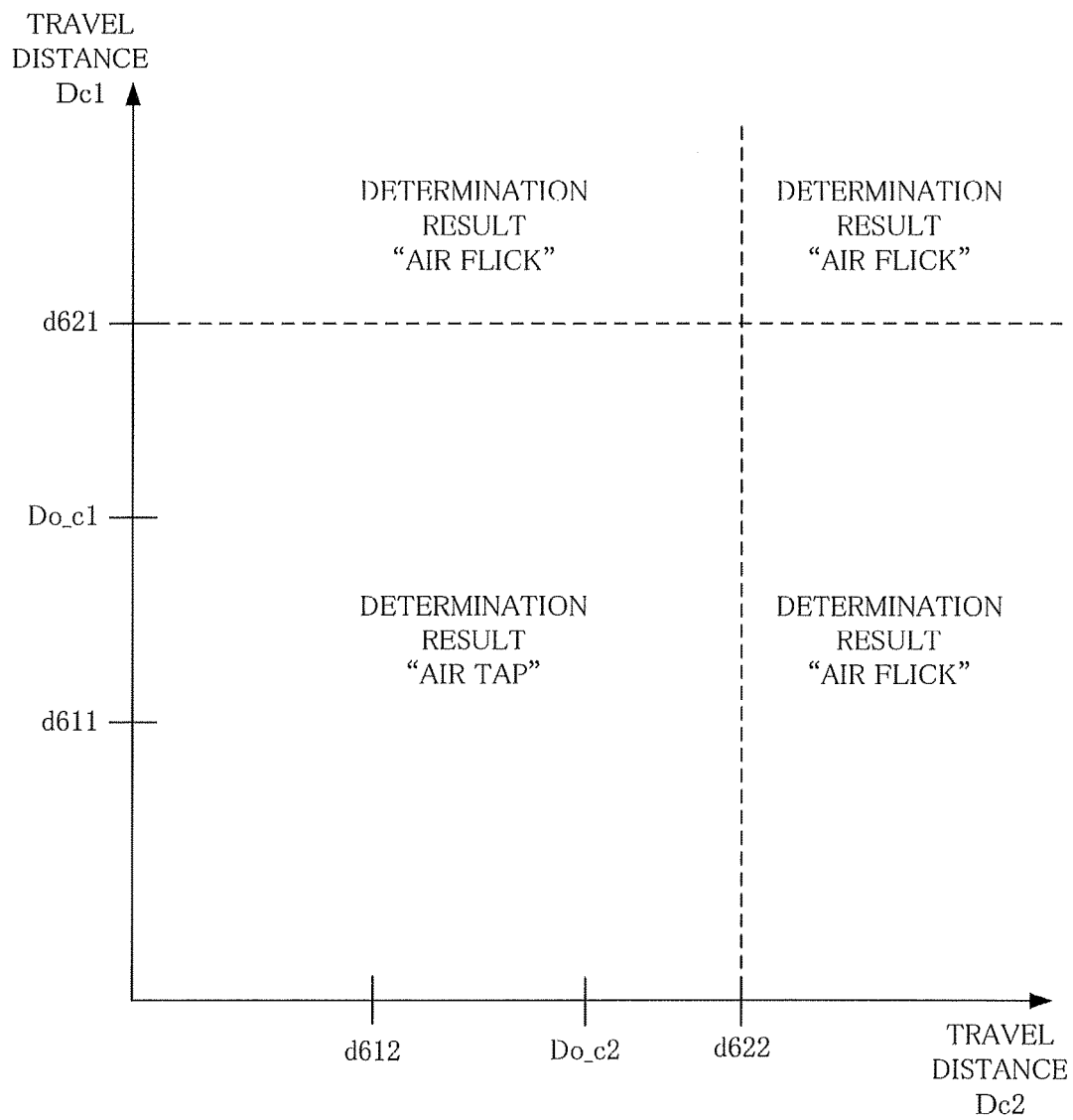

FIG. 17 is a diagram showing a modification of the functional configuration of the image forming apparatus 1. FIG. 18 is a diagram showing an example of air tap threshold data 5PF. FIG. 19 is a flowchart depicting an example of the flow of processing for distinguishing between air tap and air flick. FIGS. 20A and 20B are diagrams showing an example of the determination result of air tap and the determination result of air flick on a screen-by-screen basis.

In the first and second embodiments, the image forming apparatus 1 identifies a gesture made by a user based on change in position touched on the display surface of the touch-sensitive panel display 10e. Meanwhile, in the third embodiment, the image forming apparatus 1 analyzes an air gesture. The "air gesture" herein is a gesture represented with movement of a finger in a front space of the touch-sensitive panel display 10e. The air gesture does not involve actually touching the touch-sensitive panel display 10e.

According to the third embodiment, the image forming apparatus 1 distinguishes, in particular, between air tap and air flick. The "air tap" herein means a gesture in which a user pretends to make a tap gesture. To be specific, the air tap is a gesture in which the user brings his/her finger closer to the touch-sensitive panel display 10e without touching the same and immediately draws the finger thereaway. The "air flick" herein means a gesture in which the user pretends to make a flick gesture. To be specific, the air flick is a gesture in which the user brings his/her finger closer to the touch-sensitive panel display 10e without touching the same and quickly moves the finger in parallel with the display surface of the touch-sensitive panel display 10e.

The configuration of the intranet 3 according to the third embodiment is the same as that of each of the first and second embodiments shown in FIG. 1. The hardware configuration and functional configuration of the image forming apparatus 1 in the third embodiment are basically the same as those of the first embodiment and the second embodiment shown in FIG. 2 and FIG. 3, respectively. Note however that, as shown in FIG. 17, the gesture analyzing portion 101 is configured of an air tap threshold storage portion 151, an air tap threshold read-out portion 152, a motion characteristics information obtaining portion 153, a first distance comparison portion 154, a second distance comparison portion 155, a gesture identifying portion 156, and so on.

As shown in FIG. 18, the air tap threshold storage portion 151 stores, therein, air tap threshold data 5PF on a screen-by-screen basis. The air tap threshold data 5PF indicates a screen identifier Gi, a display surface distance threshold Dmax_c, and a vertical axis distance threshold Dmin_c. The display surface distance threshold Dmax_c and the vertical axis distance threshold Dmin_c are thresholds used to distinguish between air tap and air flick.

When the video camera 10n detects a finger, the air tap threshold read-out portion 152 through the gesture identifying portion 156 perform processing in a manner as shown in FIG. 19.

The air tap threshold read-out portion 152 reads out air tap threshold data 5PF on the current screen from the air tap threshold storage portion 151 (Step #731)

The motion characteristics information obtaining portion 153 analyzes a finger image captured by the video camera 10n, and thereby, determines a finger travel distance Dc1 on a plane (XY-plane) parallel with the display surface of the touch-sensitive panel display 10e and a finger travel distance Dc2 in the vertical direction (Z-axis) on the display surface thereof (Step #732).

The first distance comparison portion 154 compares the travel distance Dc1 with a display surface distance threshold Dmax_c indicated in the air tap threshold data 5PF, and judges whether or not the travel distance Dc1 is smaller than the display surface distance threshold Dmax_c (Step #733).

If the travel distance Dc1 is smaller than the distance threshold Dmax_c (Yes in Step #734), then the second distance comparison portion 155 compares the travel distance Dc2 with a vertical axis distance threshold Dmin_c indicated in the air tap threshold data 5PF, and judges whether or not the travel distance Dc2 is smaller than the vertical axis distance threshold Dmin_c (Step #735).

The gesture identifying portion 156 identifies the type of an air gesture in accordance with the results of determination by the first distance comparison portion 154 and the second distance comparison portion 155. The gesture identifying portion 156 determines as follows. If the travel distance Dc1 is smaller than the display surface distance threshold Dmax_c (Yes in Step #734), and at the same time, if the travel distance Dc2 is smaller than the vertical axis distance threshold Dmin_c (Yes in Step #736), then the gesture identifying portion 156 determines the air gesture to be an air tap gesture (Step #737). On the other hand, if the travel distance Dc1 is equal to or smaller than the distance threshold Dmax_c (No in Step #734), or, alternatively, if the travel distance Dc2 is equal to or smaller than the vertical axis distance threshold Dmin_c (No in Step #736), then the gesture identifying portion 156 determines the air gesture to be an air flick gesture (Step #738).

The description goes on to a difference between the determination results of gestures while a comparison is made between a case where the document transmission screen 61 shown in FIG. 6 is displayed and a case where the job history check screen 62 shown in FIG. 7 is displayed.

The layouts, uses, and so on of the document transmission screen 61 and the job history check screen 62 are the same as those discussed earlier. In the third embodiment, however, air tap is used instead of tap, and air flick is used instead of flick.

Therefore, while the document transmission screen 61 is displayed, a tendency in which a gesture made by the user is determined to be an air flick gesture is preferably higher than usual.

In view of this, a value smaller than a distance default value Do_c1 (in general, standard value of change in position on the XY-plane tolerated as air tap) is preset, as the display surface distance threshold Dmax_c, in the air tap threshold data 5PF (see FIG. 18) for the document transmission screen 61. Hereinafter, the preset value is referred to as a "distance threshold d611". Further, a value smaller than a distance default value Do_c2 (in general, standard value of change in position in th Z-axis direction tolerated as air tap) is preset as the vertical axis distance threshold Dmin_c. Hereinafter, the preset value is referred to as a "distance threshold d612".

On the other hand, while the job history check screen 62 is displayed, a tendency in which a gesture made by the user is determined to be an air tap gesture is preferably higher than usual.

In view of this, a value greater than the distance threshold d611 or a value greater than the distance default value Do_c1 is preset, as the display surface distance threshold Dmax_c, in the air tap threshold data 5PF for the job history check screen 62. Hereinafter, the preset value is referred to as a "distance threshold d621". Further, a value greater than the distance threshold d612 or a value greater than the distance default value Do_c2 is preset as the vertical axis distance threshold Dmin_c. Hereinafter, the preset value is referred to as a "distance threshold d622".

As discussed above, the distance threshold d621 is smaller than the distance threshold d611. The distance threshold d622 is smaller than the distance threshold d612. Therefore, according to the processing shown in FIG. 19, it is more often determined that a gesture made by the user is an air flick gesture in a case where the document transmission screen 61 is displayed than in a case where the job history check screen 62 is displayed. This is known from the comparison between FIG. 20A and FIG. 20B. Further, it is more often determined that a gesture made by the user is an air tap gesture in a case where the job history check screen 62 is displayed than in a case where the document transmission screen 61 is displayed. This is also known from the comparison between FIG. 20A and FIG. 20B.

Referring back to FIG. 17, the screen display control portion 102 and the job execution control portion 103 operate in a manner similar to those in the first and second embodiments. Note that, as the result of determination of the gesture, the result of determination by the gesture identifying portion 156 is used.

According to the third embodiment, it is possible to distinguish between air tap and air flick on a screen-by-screen basis more appropriately than is conventionally possible. This causes less inconvenience to users than with conventional methods, or, improves the user-friendliness as compared to conventional methods.

Figure 21:
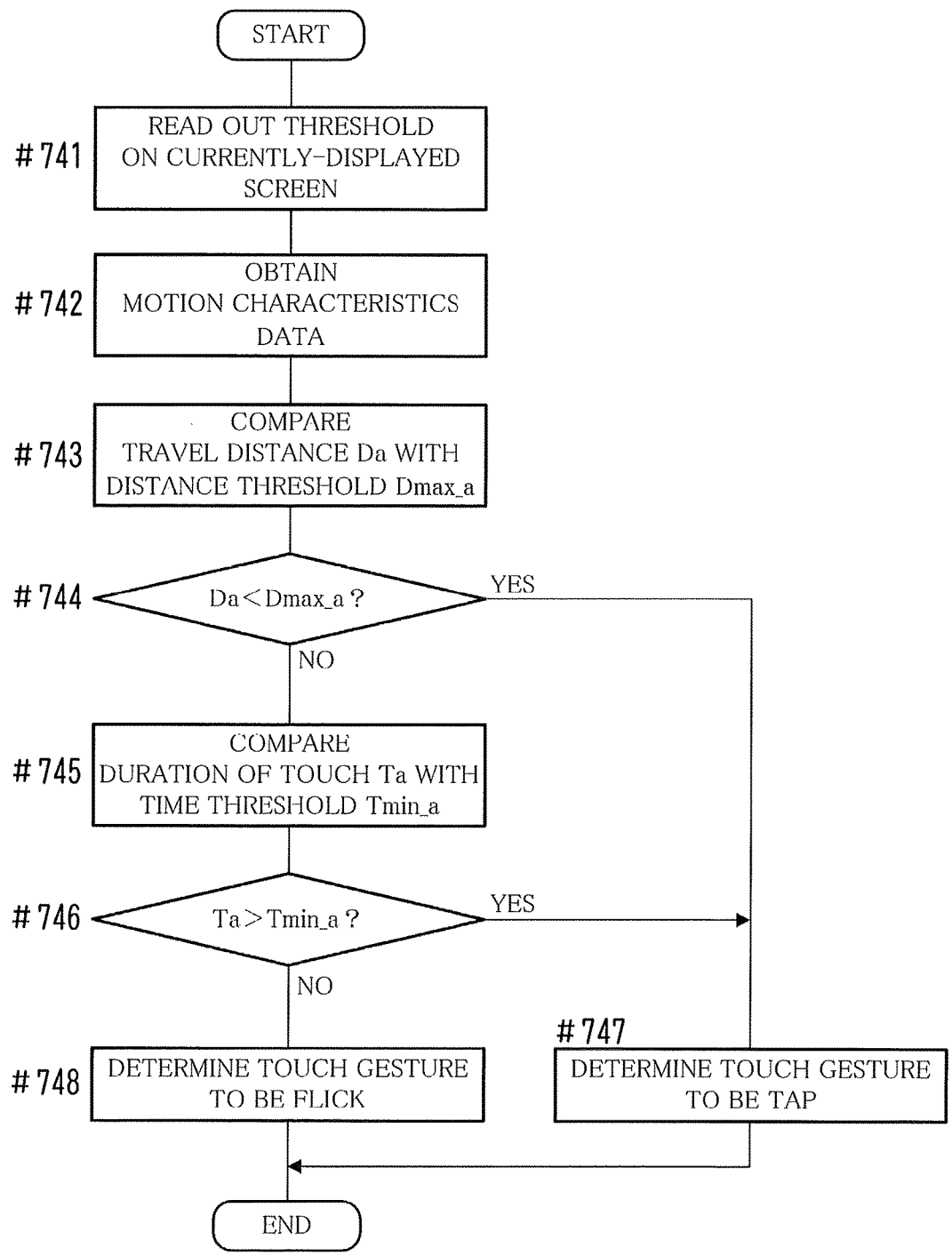
FIG. 21 is a flowchart depicting a modification of the flow of processing for distinguishing between tap and flick.

FIG. 21 is a flowchart depicting a modification of the flow of processing for distinguishing between tap and flick.

In the first through third embodiments, rules used to distinguish between gestures are made different for each screen by changing the thresholds. Instead of this, however, it is possible to make such rules be different by changing another item other than the thresholds.

For example, different algorithms for distinguishing between gestures may be used for each screen. To be specific, in the first embodiment, the algorithm shown in FIG. 5 is used as an algorithm for distinguishing between tap and flick on the document transmission screen 61. On the other hand, such an algorithm depicted in FIG. 21 is used as an algorithm for the job history check screen 62. According to the algorithm, if at least one of distance conditions and time conditions is satisfied (Yes in Step #744 or Yes in Step #746), a gesture is determined to be a tap gesture.

Alternatively, it is possible to change, for each screen, parameters (finger travel distance, finger travel time, and so on) used for distinguishing between gestures. For example, in the third embodiment, if the current screen is the job history check screen 62, conditions for travel distance in a plane parallel with the display surface of the touch-sensitive panel display 10e are not used, and instead, conditions for travel distance in the vertical direction may be referred to.

In the first through third embodiments, two parameters are used to distinguish between gestures. Instead of this, however, one parameter may be used to distinguish between gestures. Three or more parameters may be used to distinguish between gestures.

In the first embodiment, tap and flick are distinguished from each other. In the second embodiment, press and drag are distinguished from each other. The present invention is applicable to a case where tap and press are distinguished from each other, and also to a case where flick and drag are distinguished from each other. In such cases, thresholds for duration of touch are mainly changed on a screen-by-screen basis. In order to increase a tendency in which a gesture is determined to be a tap gesture or a flick gesture, thresholds are preferably set to have a large value.

The present invention is also applicable to a case where gestures represented through a multi-finger motion (multi-touch gestures) are distinguished from each other.

For example, the present invention is applicable to a case where tap with two fingers and flick with two fingers are distinguished from each other. In such a case, a travel distance or a travel time is compared with a threshold as with the first embodiment.

The present invention may be also used to distinguish between pinch and scroll with two fingers (gesture of moving two fingers in a parallel fashion). In such a case, a change ratio of distance between two fingers is detected. If the absolute value of the change ratio is smaller than a threshold, then the gesture is determined to be scroll with two fingers. If the absolute value of the change ratio is equal to or greater than the threshold, then the gesture is determined to be pinch. In order to increase a tendency in which a gesture is determined to be scroll with two fingers, the threshold is set to have a large value. In contrast, in order to increase a tendency in which a gesture is determined to be pinch, the threshold is set to have a small value.

In the third embodiment, the video camera 10n is used to detect a finger travel distance. Instead of this, the detection may be made by using a controller with a three-axis acceleration sensor (for example, Wii remote controller provided by Nintendo Co., Ltd. or iPhone provided by Apple, Inc.), a three-dimensional gesture controller (for example, Leap Motion Controller provided by Leap Motion, Inc.), and so on.

The first through third embodiments are described by taking an example in which a user directly operates the image forming apparatus 1. The present invention is also applicable to a case where a user remotely operates the image forming apparatus 1 via the terminal 2. In such a case, the terminal 2 executes processing for identifying a gesture, and the result of determination is sent to the image forming apparatus 1, and then, the image forming apparatus 1 are supplied with commands or data. Alternatively, the terminal 2 sends data on motion to the image forming apparatus 1, and the motion characteristics information obtaining portion 123, 133, or 153 of the image forming apparatus 1 (see FIGS. 3, 9 and 17) receives the data. After that, the gesture identifying portion 126, 136, or 156 performs processing for identifying a gesture in the manner discussed above.

According to the first through third embodiments, it is possible to bring benefits to users in a device which performs processing based on a gesture.

It is to be understood that the configurations of intranet 3 and the image forming apparatus 1, the constituent elements thereof, the content and order of the processing, the configuration of data, the structure of screens and the like can be appropriately modified without departing from the spirit of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A device for determining a gesture, comprising:
a display device to selectively display one of a plurality of different screens;
a storage device to store a plurality of different respective rules used for distinguishing between gestures, each of the plurality of different screens corresponding to a distinct one of the plurality of different respective rules;
a detector to detect a motion made by a user, and
a hardware processor configured to identify, from among the gestures, a gesture represented by the detected motion based on the respective rule for a current screen, the current screen being one of the plurality of different screens and being displayed at a time when the motion has been detected,
wherein
the detector includes a touch-sensitive panel, and detects, as the motion, a position touched by a user finger on the touch-sensitive panel at predetermined time intervals,
the storage device stores, as the respective rule, a distance threshold, and
the hardware processor determines that a gesture represented by the motion is a first gesture or determines that a gesture represented by the motion is a second gesture based on a travel distance of the user finger calculated based on the position detected by the detector and the distance threshold.

2. The device according to claim 1, wherein
the display device displays, as one of the plurality of different screens, a destination selection screen on which buttons used for the user to select a data destination through a first gesture appear in order by scrolling in accordance with a second gesture made by the user, and
the storage device stores, as the respective rule for the destination selection screen, a rule according to which a gesture represented by the motion tends to be determined to be the second gesture in a case where the current screen is the destination selection screen as compared to a case where the current screen is another different screen.

3. The device according to claim 1, wherein
the display device displays, as one of the plurality of different screens, a job list screen on which buttons used for the user to select a job of which attributes are to be outputted through a first gesture appear in order by scrolling in accordance with a second gesture made by the user, and
the storage device stores, as the respective rule for the job list screen, a rule according to which a gesture represented by the motion tends to be determined to be the first gesture in a case where the current screen is the job list screen as compared to a case where the current screen is another different screen.

4. The device according to claim 1, wherein the first gesture is tap, and the second gesture is flick.

5. The device according to claim 1, wherein the first gesture is press, and the second gesture is drag.

6. The device according to claim 1, further comprising a video camera to detect a motion made by the user,
wherein the first gesture is air tap, and the second gesture is air flick.

7. The device according to claim 1, wherein
the hardware processor determines that a gesture represented by the motion is a first gesture if a travel distance of the user finger calculated based on the position detected is smaller than the distance threshold, and determines that the gesture is a second gesture if the travel distance is greater than the distance threshold.

8. The device according to claim 7, wherein
the display device displays, as one of the plurality of different screens, a destination selection screen on which buttons used for the user to select a data destination through the first gesture appear in order by scrolling in accordance with the second gesture made by the user, and
the storage device stores, as the distance threshold for the destination selection screen, a distance threshold having a value smaller than that of the distance threshold for another type of screen.

9. The device according to claim 7, wherein
the display device displays, as one of the plurality of different screens, a job list screen on which buttons used for the user to select a job of which attributes are to be outputted through the first gesture appear in order by scrolling in accordance with the second gesture made by the user, and
the storage device stores, as the distance threshold for the job list screen, a distance threshold having a value greater than that of the distance threshold for another different screen.

10. The device according to claim 1, wherein the detector includes a touch-sensitive panel, and detects, as the motion, a position touched by a user finger on the touch-sensitive panel at predetermined time intervals,
the storage device stores, as the respective rule, a time threshold, and
the hardware processor determines that a gesture represented by the motion is a first gesture if a duration of touch during which the position is continuously detected by the detector is greater than the time threshold, and determines that the gesture is a second gesture if the duration of touch is smaller than the time threshold.

11. The device according to claim 10, wherein
the display device displays, as one of the plurality of different screens, a destination selection screen on which buttons used for the user to select a data destination through a first gesture appear in order by scrolling in accordance with a second gesture made by the user, and
the storage device stores, as the time threshold for the destination selection screen, a time threshold having a value greater than that of the time threshold for another different screen.

12. The device according to claim 10, wherein the display device displays, as one of the plurality of different screens, a job list screen on which buttons used for the user to select a job of which attributes are to be outputted through a first gesture appear in order by scrolling in accordance with a second gesture made by the user, and
the storage device stores, as the time threshold for the job list screen, a time threshold having a value smaller than that of the time threshold for another different screen.

13. The device according to claim 7, wherein the first gesture is tap, and the second gesture is flick.

14. The device according to claim 7, wherein the first gesture is press, and the second gesture is drag.

15. The device according to claim 1, wherein
the detector detects, as the motion, a position of a user finger in a three-dimensional space at predetermined time intervals,
the storage device stores, as the respective rule, a distance threshold, and
the hardware processor determines that a gesture represented by the motion is air flick if a travel distance of the user finger in a vertical direction of a display surface of the display device calculated based on the position detected by the detector is greater than the distance threshold, and determines that the gesture is air tap if the travel distance is smaller than the distance threshold.

16. The device according to claim 1, wherein
the detector detects, as the motion, a position of a user finger in a three-dimensional space at predetermined time intervals,
the storage device stores, as the respective rule, a distance threshold, and
the hardware processor determines that a gesture represented by the motion is air flick if a travel distance of the user finger on a plane parallel with a display surface of the display device calculated based on the position detected by the detector is greater than the distance threshold, and determines that the gesture is air tap if the travel distance is smaller than the distance threshold.

17. The device according to claim 15, wherein
the display device displays, as one of the plurality of different screens, a destination selection screen on which buttons used for the user to select a data destination through the air tap appear in order by scrolling in accordance with the air flick made by the user, and
the storage device stores, as the distance threshold for the destination selection screen, a distance threshold having a value smaller than that of the distance threshold for another different screen.

18. The device according to claim 15, wherein
the display device displays, as one of the plurality of different screens, a job list screen on which buttons used for the user to select a job of which attributes are to be outputted through the air tap appear in order by scrolling in accordance with an air gesture made by the user, and
the storage device stores, as the distance threshold for the job list screen, a distance threshold having a value greater than that of the distance threshold for another different screen.

19. A device for determining a gesture, comprising:
a receiving device configured to receive, from a portable terminal including a display device for selectively displaying one of plurality of different screens and a detector for detecting a motion made by a user, the motion detected by the detector;
a storage device to store a plurality of different respective rules used for distinguishing between gestures, each of the plurality of different screens corresponding to a distinct one of the plurality of different respective rules; and a hardware processor configured to identify, from among the gestures, a gesture represented by the motion received by the receiving device based on the respective rule for a current screen, the current screen being one of the plurality of different screens and being displayed at a time when the motion has been detected, wherein the detector includes a touch-sensitive panel, and detects, as the motion, a position touched by a user finger on the touch-sensitive panel at predetermined time intervals, the storage device stores, as the respective rule, a distance threshold, and the hardware processor determines that a gesture represented by the motion is a first gesture or determines that a gesture represented by the motion is a second gesture based on a travel distance of the user finger calculated based on the position detected by the detector and the distance threshold.

20. A method for determining which one of gestures is made by a user of a display device for selectively displaying one of plurality of different screens and a detector for detecting a motion, the method comprising:

storing in a storage device, a plurality of different respective rules used for distinguishing between the gestures, each of the plurality of different screens corresponding to a distinct one of the plurality of different respective rules;

detecting, by the detector, the motion made by the user; and identifying by a computer, from among the gestures, a gesture represented by the motion detected by the detector based on the respective rule for a current screen, the current screen being one of the plurality of different screens and being displayed at a time when the motion has been detected, wherein the detector includes a touch-sensitive panel, and detects, as the motion, a position touched by a user finger on the touch-sensitive panel at predetermined time intervals, the storage device stores, as the respective rule, a distance threshold, and the computer determines that a gesture represented by the motion is a first gesture or determines that a gesture represented by the motion is a second gesture based on a travel distance of the user finger calculated based on the position detected by the detector and the distance threshold.

21. A non-transitory computer-readable storage medium storing thereon a computer program used in a computer, the computer being connectable to a display device for selectively displaying one of plurality of different screens, a storage device for storing, a plurality of different respective rules used for distinguishing between gestures, each of the plurality of different screens corresponding to a distinct one of the plurality of different respective rules, and a detector for detecting a motion, the computer program causing the computer to perform processing comprising:

identifying, from among the gestures, a gesture represented by the motion detected by the detector based on the respective rule for a current screen, the current screen being one of the plurality of different screens and being displayed at a time when the motion has been detected, wherein the detector includes a touch-sensitive panel, and detects, as the motion, a position touched by a user finger on the touch-sensitive panel at predetermined time intervals, the storage device stores, as the respective rule, a distance threshold, and the computer determines that a gesture represented by the motion is a first gesture or determines that a gesture represented by the motion is a second gesture based on a travel distance of the user finger calculated based on the position detected by the detector and the distance threshold.

22. The device according to claim 1, wherein according to each of the respective rules, the gesture represented by the detected motion is determined to be a gesture corresponding to a scrolling operation rather than a gesture corresponding to a selecting operation at least in part based on the current screen having a priority placed on scrolling as compared to a case where the current screen has a priority placed on selecting, and the gesture represented by the detected motion is determined to be the gesture corresponding to the selecting operation rather than the gesture corresponding to the scrolling operation at least in part based on the current screen having a priority placed on selecting as compared to a case where the current screen has a priority placed on scrolling.

* * * * *